(12) United States Patent
Yedid et al.

(10) Patent No.: US 11,867,535 B2
(45) Date of Patent: Jan. 9, 2024

(54) OPTICAL-PATH FOLDING-ELEMENT WITH AN EXTENDED TWO DEGREE OF FREEDOM ROTATION RANGE

(71) Applicant: Corephotonics Ltd., Tel Aviv (IL)

(72) Inventors: Itay Yedid, Tel Aviv (IL); Ephraim Goldenberg, Tel Aviv (IL); Gil Bachar, Tel Aviv (IL); Gal Barak, Tel Aviv (IL); Yiftah Kowal, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/337,005

(22) Filed: Jun. 18, 2023

(65) Prior Publication Data
US 2023/0332928 A1  Oct. 19, 2023

Related U.S. Application Data

(63) Continuation of application No. 18/299,727, filed on Apr. 13, 2023, now Pat. No. 11,733,064, which is a
(Continued)

(51) Int. Cl.
*G01D 5/14* (2006.01)
*G02B 13/00* (2006.01)
(Continued)

(52) U.S. Cl.
CPC .............. *G01D 5/145* (2013.01); *G01P 13/00* (2013.01); *G02B 7/18* (2013.01); *G02B 7/1827* (2013.01);
(Continued)

(58) Field of Classification Search
CPC .......... G01D 5/145; G01P 13/00; G02B 7/18; G02B 7/1827; G02B 13/0065;
(Continued)

(56) References Cited

U.S. PATENT DOCUMENTS 3,085,354 A   4/1963 Rasmussen et al.
3,584,513 A   6/1971 Gates
(Continued)

FOREIGN PATENT DOCUMENTS

CN   101276415 A   10/2008
CN   201514511 U   6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Alvaro E Fortich
(74) *Attorney, Agent, or Firm* — Nathan & Associates; Menachem Nathan

(57) ABSTRACT

Actuators for rotating an optical-path-folding-element with two, first and second, degrees of freedom in an extended rotation range around two respective rotation axes, folded cameras including such actuators and dual-cameras including a folded camera as above together with an upright camera.

34 Claims, 26 Drawing Sheets

Related U.S. Application Data continuation of application No. 17/984,355, filed on Nov. 10, 2022, now Pat. No. 11,650,080, which is a continuation of application No. 17/829,722, filed on Jun. 1, 2022, now Pat. No. 11,506,513, which is a continuation of application No. 17/013,561, filed on Sep. 5, 2020, now Pat. No. 11,359,937, which is a continuation of application No. 16/615,310, filed as application No. PCT/IB2019/053315 on Apr. 22, 2019, now Pat. No. 11,268,829.

(60) Provisional application No. 62/661,158, filed on Apr. 23, 2018.

(51) Int. Cl.

| | | |
|---|---|---|
| *H04N 23/58* | (2023.01) | |
| *G01P 13/00* | (2006.01) | |
| *H04N 23/698* | (2023.01) | |
| *H04N 23/69* | (2023.01) | |
| *H04N 23/45* | (2023.01) | |
| *H04N 23/57* | (2023.01) | |
| *G02B 7/182* | (2021.01) | |
| *H01F 7/02* | (2006.01) | |
| *G02B 7/18* | (2021.01) | |
| *G03B 17/17* | (2021.01) | |
| *H04N 23/55* | (2023.01) | |

(52) U.S. Cl.
CPC ......... *G02B 13/0065* (2013.01); *G03B 17/17* (2013.01); *H01F 7/02* (2013.01); *H04N 23/45* (2023.01); *H04N 23/57* (2023.01); *H04N 23/58* (2023.01); *H04N 23/69* (2023.01); *H04N 23/698* (2023.01); *H04N 23/55* (2023.01)

(58) Field of Classification Search
CPC .......... G03B 17/17; H01F 7/02; H04N 23/45; H04N 23/57; H04N 23/58; H04N 23/69; H04N 23/698; H04N 23/55
See application file for complete search history.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |

(56) References Cited

U.S. PATENT DOCUMENTS

| | | |
|---|---|---|
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |

(56) References Cited

U.S. PATENT DOCUMENTS

| | | |
|---|---|---|
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0067335 A1* | 3/2018 | Chen ................... H04N 23/686 |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0213712 A1 | 7/2019 | Lashdan et al. |
| 2019/0215440 A1 | 7/2019 | Rivard et al. |
| 2019/0222758 A1* | 7/2019 | Goldenberg ............ G02B 27/64 |
| 2019/0228562 A1 | 7/2019 | Song |
| 2019/0235202 A1* | 8/2019 | Smyth .................... H04N 23/55 |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2020/0400464 A1* | 12/2020 | Yedid ....................... G02B 7/18 |
| 2021/0180989 A1 | 6/2021 | Fukumura et al. |
| 2021/0333521 A9 | 10/2021 | Yedid et al. |
| 2022/0252963 A1* | 8/2022 | Shabtay ................. G03B 15/03 |

FOREIGN PATENT DOCUMENTS

| | | |
|---|---|---|
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 103841404 A | 6/2014 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006237914 A | 9/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |

(56) References Cited

FOREIGN PATENT DOCUMENTS

| | | | |
|---|---|---|---|
| JP | 2013101213 A | 5/2013 | |
| JP | 2013106289 A | 5/2013 | |
| JP | 2016105577 A | 6/2016 | |
| JP | 2017146440 A | 8/2017 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | 2017025822 A1 | 2/2017 | |
| WO | 2017037688 A1 | 3/2017 | |
| WO | 2018130898 A1 | 7/2018 | |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

\* cited by examiner

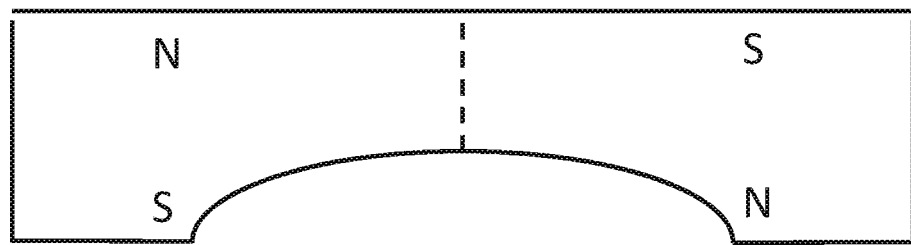
FIG. 11 - i
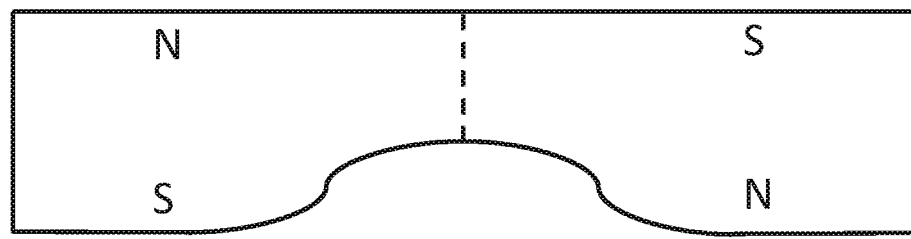
FIG. 11- ii
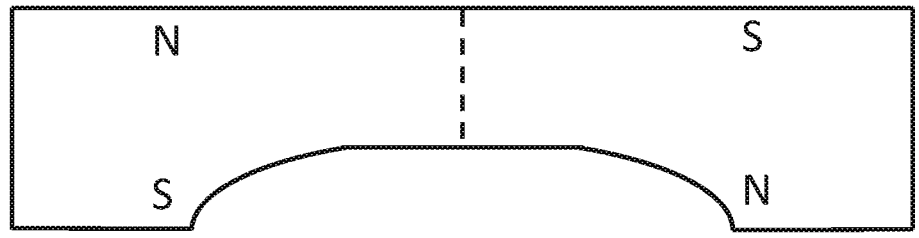
FIG. 11-iii

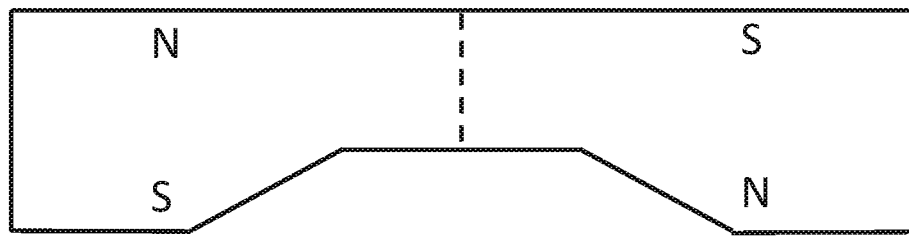
FIG. 11-iv
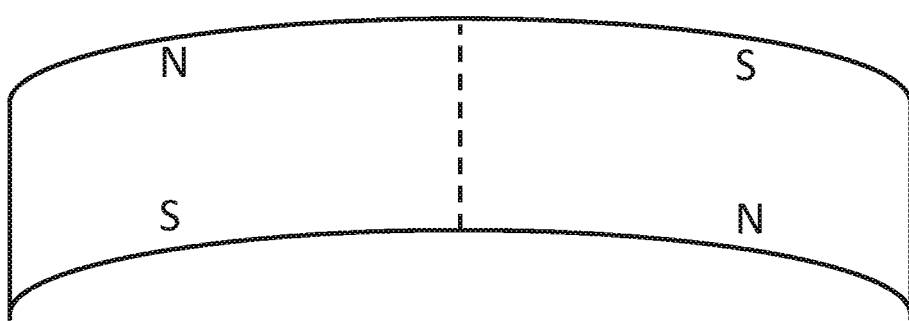
FIG. 11-v
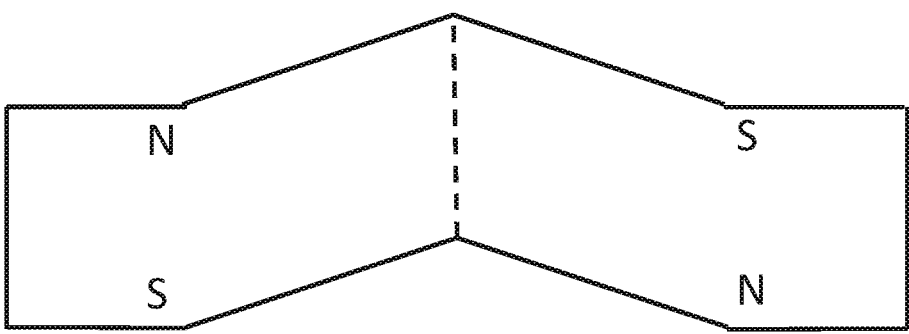
FIG. 11-vi

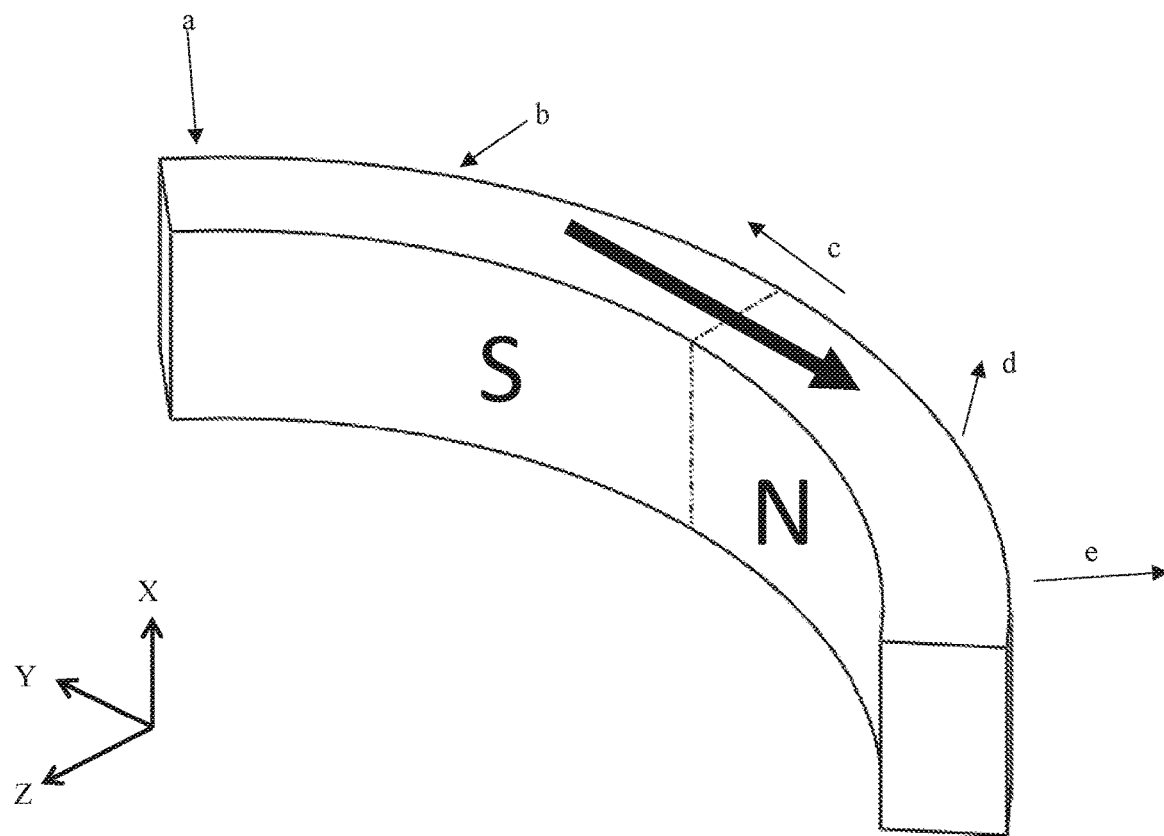
FIG. 15D
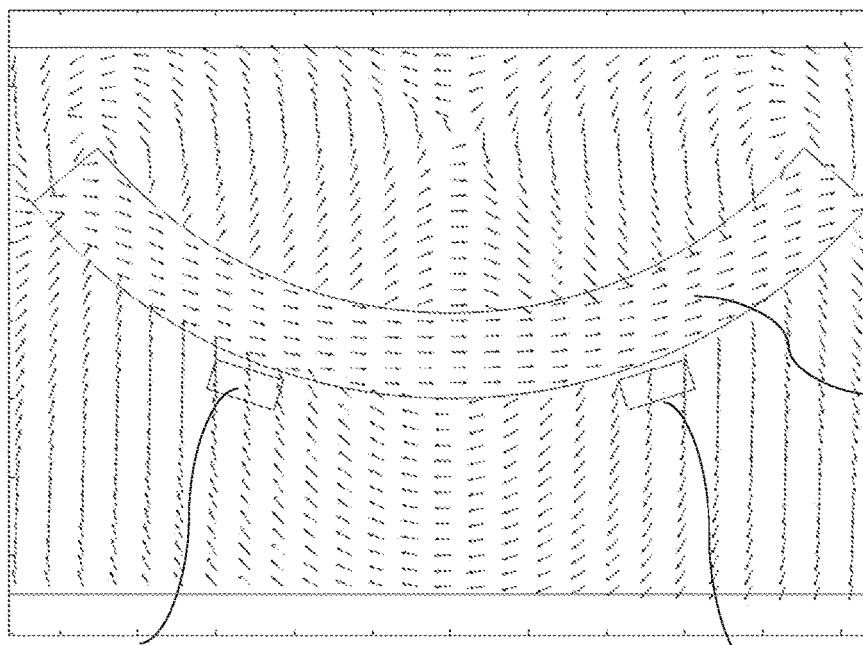
FIG. 15E    One sensor position        Another sensor position        1510

OPTICAL-PATH FOLDING-ELEMENT WITH AN EXTENDED TWO DEGREE OF FREEDOM ROTATION RANGE

CROSS-REFERENCE TO RELATED APPLICATIONS

This is a continuation application from U.S. patent application Ser. No. 18/299,727 filed Apr. 13, 2023 (now allowed), which was a continuation application from U.S. patent application Ser. No. 17/984,355 filed Nov. 10, 2022 (now U.S. Pat. No. 11,650,080), which was a continuation application from U.S. patent application Ser. No. 17/829,722 filed Jun. 1, 2022 (now U.S. Pat. No. 11,506,513), which was a continuation application from U.S. patent application Ser. No. 17/013,561 filed Sep. 5, 2020 (now U.S. Pat. No. 11,359,937), which was a continuation application from U.S. patent application Ser. No. 16/615,310 filed Nov. 20, 2019 (now U.S. Pat. No. 11,268,829), which was a 371 application from international patent application PCT/IB2019/053315 filed Apr. 22, 2019, and is related to and hereby claims the priority benefit of commonly-owned and co-pending U.S. Provisional Patent Application No. 62/661,158 filed Apr. 23, 2018, which is incorporated herein by reference in its entirety.

FIELD

The subject matter disclosed herein relates in general to a folded-lens and to digital cameras with one or more folded lens.

BACKGROUND

In recent years, mobile devices such as cell-phones (and in particular smart-phones), tablets and laptops have become ubiquitous. Many of these devices include one or two compact cameras including, for example, a main rear-facing camera (i.e. a camera on the back face of the device, facing away from the user and often used for casual photography), and a secondary front-facing camera (i.e. a camera located on the front face of the device and often used for video conferencing).

Although relatively compact in nature, the design of most of these cameras is similar to the traditional structure of a digital still camera, i.e. it comprises a lens module (or a train of several optical elements) placed on top of an image sensor. The lens module refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane), the larger the focal length and the optics height.

A "folded camera module" structure has been suggested to reduce the height of a compact camera. In the folded camera module structure, an optical path folding element (referred to hereinafter as "OPFE" that includes a reflection surface such as a prism or a mirror;otherwise referred to herein collectively as a "reflecting element") is added in order to tilt the light propagation direction from a first optical path (e.g. perpendicular to the smart-phone back surface) to a second optical path, (e.g. parallel to the smart-phone back surface). If the folded camera module is part of a dual-aperture camera, this provides a folded optical path through one lens module (e.g. a Tele lens). Such a camera is referred to herein as a "folded-lens dual-aperture camera" or a "dual-aperture camera with a folded lens". In some examples, the folded camera module may be included in a multi-aperture camera, e.g. together with two "non-folded" camera modules in a triple-aperture camera.

A folded-lens dual-aperture camera (or "dual-camera") with an auto-focus (AF) mechanism is disclosed in Applicant's U.S. published patent application No. 20160044247.

SUMMARY

According to one aspect of the presently disclosed subject matter there is provided an actuator for rotating an OPFE in two degrees of freedom in an extended rotation range a first sub-assembly, a second sub-assembly and a stationary sub-assembly, the first sub-assembly configured to rotate the OPFE relative to the stationary sub-assembly in an extended rotation range around a yaw rotation axis and the second sub-assembly configured to rotate the OPFE relative to the first sub-assembly in an extended rotation range around a pitch rotation axis that is substantially perpendicular to the yaw rotation axis; a first sensor configured to sense rotation around the yaw rotation axis and a second sensor configured to sense rotation around the pitch rotation axis, the first and second sensors being fixed to the stationary sub-assembly, wherein at least one of the first sensor or the second sensor is a magnetic flux sensor; and a voice coil motor (VCM) comprising a magnet and a coil, wherein the magnet is fixedly attached to one of the first sub-assembly or the second sub-assembly, wherein the coil is fixedly attached to the stationary sub-assembly, wherein a driving current in the coil creates a force that is translated to a torque around a respective rotation axis, and wherein the second sensor is positioned such that sensing by the second sensor is decoupled from the rotation of the OPFE around the yaw rotation axis.

In addition to the above features, the actuator according to this aspect of the presently disclosed subject matter can optionally comprise one or more of features (i) to (xxv) listed below, in any technically possible combination or permutation:

i. wherein the actuator is adapted to be installed and operable in a folded digital camera for rotating the OPFE within the camera,
ii. wherein the actuator comprises a first actuation mechanism (including a first VCM) configured to rotate the first sub-assembly around the yaw rotation axis and a second actuation mechanism (including a second VCM) configured to rotate the second sub-assembly around the yaw rotation axis,
iii. wherein the actuator comprises a first sensing mechanism that comprises the first sensor and a respective first magnet configured to sense the rotation around the yaw rotation axis and a second sensing mechanism that comprises the second sensor and a second magnet configured to sense the rotation around the pitch rotation axis,
iv. wherein the yaw rotation axis passes through the second sensor to thereby decouple the second sensor from rotation around the yaw axis,
v. wherein the yaw rotation axis passes through a center of the second sensor,
vi. wherein the actuator further comprises a first curved ball-guided mechanism operative to enable the rotation around the pitch axis, and a second curved ball-guided mechanism operative to enable the rotation around the yaw axis, vii. wherein the actuator further comprises a curved ball-guided mechanism operative to enable the rotation around the yaw axis, the curved ball-guided mechanism is located on a side of the OPFE which is opposite to side facing an image sensor, viii. wherein the extended rotation range is equal to or greater than ±5 degrees around the pitch and yaw rotation axes, ix. wherein the extended rotation range is equal to or greater than ±10 degrees the pitch and yaw rotation axes, x. wherein the extended rotation range is between ±15-40 degrees around the pitch and yaw rotation axes, xi. wherein the extended rotation range around the pitch rotation axis is different from the extended rotation range around the second rotation axis, xii. wherein the at least one voice coil motor includes a pitch magnet and a coil dedicated for generating the rotation around the pitch rotation axis and wherein the pitch magnet is designed with a flat surface facing the coil, xiii. wherein the magnetic sensor is a magnetic flux sensor such as a Hall sensor.

xiv. wherein the actuator comprises a sensing mechanism that includes the first sensor and a magnet (e.g. yaw sensing magnet), the magnet is shaped or formed such that a central part of the sensing magnet is further away from a projection line of motion of the first sensor, relative to an end of the sensing magnet, xv. wherein the actuator comprises a sensing magnet (e.g. yaw sensing magnet) shaped such that width of a cross section of the sensing magnet increases from a point substantially at its center towards each end of the magnet, thereby resulting in a variable distance between the first sensor and the magnet when relative movement occurs between the sensing magnet and the sensor, xvi. wherein the actuator further comprises a first magnet-yoke pair which pulls the first sub-assembly to the second sub-assembly in a radial direction relative to the pitch rotation axis and a second magnet-yoke pair which pulls the first sub-assembly to the stationary sub-assembly in a radial direction relative to the yaw rotation axis, xvii. wherein the first sub-assembly comprises a middle moving frame, the second sub-assembly comprises an OPFE holder, and the stationary sub-assembly comprises a base; wherein the first magnet-yoke pair pulls the OPFE holder to middle moving frame and the second magnet-yoke pair pulls the middle moving frame to the base, xviii. wherein the first sub-assembly comprises a middle moving frame and the second sub-assembly comprises an OPFE holder, and the stationary sub-assembly comprises a base; wherein rotation around the yaw rotation axis is generated by rotating the middle moving frame relative to the base and rotation around the pitch rotation axis is generated by rotating the OPFE holder relative to the middle moving frame, xix. wherein the actuator comprises a magnet characterized by a cut sphere shape and a coil characterized by a circular shape, the coil is symmetrically positioned around the cut sphere, xx. wherein the actuator comprises a single magnet that is used for creating an actuation force for rotation around the yaw rotation axis, creating a pre-load force in a magnet-yoke pair for holding together the first sub-assembly and the stationary sub-assembly, and sensing the rotation around the yaw rotation axis.

xxi. wherein the actuator comprises only one magnetic flux sensor that is used for sensing rotation around the yaw rotation axis, xxii. wherein the single magnet is a polarization magnet characterized by continuous changes in direction of a magnetic field of the magnet along the magnet's length. wherein the first and second sensing mechanisms are decoupled from each other, xxiii. wherein the actuator is designed to be installed in a folded camera that comprises a lens module accommodating a plurality of lens elements along an optical axis; wherein the OPFE redirects light that enters the folded camera from a direction of a view section along a first optical path to a second optical path that passed along the optical axis, xxiv. wherein the actuator comprises a pitch magnet located at a side of the OPFE that is opposite to the side facing the view section, xxv. wherein the actuator comprises a yaw magnet located at a side of the OPFE that is opposite to the side facing the lens module According to another aspect of the presently disclosed subject matter there is provided a folded camera comprising the actuator according to the previous aspect.

In addition to the above features, the folded camera according to this aspect of the presently disclosed subject matter can optionally comprise one or more of features (i) to (xxv) listed above, in any technically possible combination or permutation.

According to yet another aspect of the presently disclosed subject matter there is provided an actuator for rotating an OPFE with a first degree of freedom (DOF) around a first rotation axis and a second DOF around a second rotation axis, comprising:

a) a first actuation mechanism for rotation in the first DOF;

b) a first sensing mechanism for sensing movement in the first DOF;

c) a second actuation mechanism for rotation in the second DOF; and d) a second sensing mechanism for sensing movement in the second DOF;

wherein first and second actuation mechanisms are configured to rotate the OPFE around the respective first or second rotation axis in an extended rotation range, and wherein in some examples the first and second actuation mechanism are voice coil motors and the second sensing mechanism comprises a sensor positioned such that rotation of the OPFE around the first rotation axis is decoupled from the second sensor.

In addition to the above features, the camera according to this aspect of the presently disclosed subject matter can optionally comprise one or more of features (i) to (xxv) listed above, in any technically possible combination or permutation.

According to another aspect of the presently disclosed subject matter there is provided a sensing mechanism for sensing rotation movement around a rotation axis, comprising a magnet and a magnetic sensor configured to detect a magnetic flux of the magnet and to determine a relative shift between the magnet and the magnetic sensor based on change in the detected magnetic flux, wherein the magnet is shaped such that a cross section of the magnet has a width that increases from a point substantially at a center of the magnet towards each end of the magnet, thereby increasing a range of detectable change in the magnetic flux and increasing a corresponding detectable range of the relative shift between the magnet and the magnetic sensor.

In addition to the above features, the actuator according to this aspect of the presently disclosed subject matter can optionally comprise one or more of features (i) to (iv) listed below, in any technically possible combination or permutation:

i. wherein the detectible range of relative shift between the magnet and the magnetic sensor is of more than 0.8 mm,
ii. wherein the detectible range of relative shift between the magnet and the magnetic sensor is of more than 1.0 mm,
iii. wherein the detectible range of relative shift between the magnet and the magnetic sensor is of more than 2.0 mm, and
iv. wherein the magnetic sensor is a Hall bar sensor.

BRIEF DESCRIPTION OF THE DRAWINGS

Non-limiting examples of the presently disclosed subject matter are described below with reference to figures attached hereto that are listed following this paragraph. Identical structures, elements or parts that appear in more than one figure may be labeled with the same numeral in the figures in which they appear. The drawings and descriptions are meant to illuminate and clarify embodiments disclosed herein, and should not be considered limiting in any way.

FIG. 11-i to FIG. 11-vi show various possible alternative examples of magnetic configuration for the yaw sensing magnet.

FIG. 15D is a schematic illustration of a single polarization magnet, according to some examples of the presently disclosed subject matter; and FIG. 15E is a schematic illustration of the magnetic field lines directions in a Y-Z plane of the single polarization magnet illustrated in FIG. 15D, according to some examples of the presently disclosed subject matter.

DETAILED DESCRIPTION

For the sake of clarity, the term "substantially" is used herein to imply the possibility of variations in values within an acceptable range as would be known to a person skilled in the art. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value. For example, the phrase substantially perpendicular should be interpreted to include possible variations from exactly 90°.

Figure 1A:
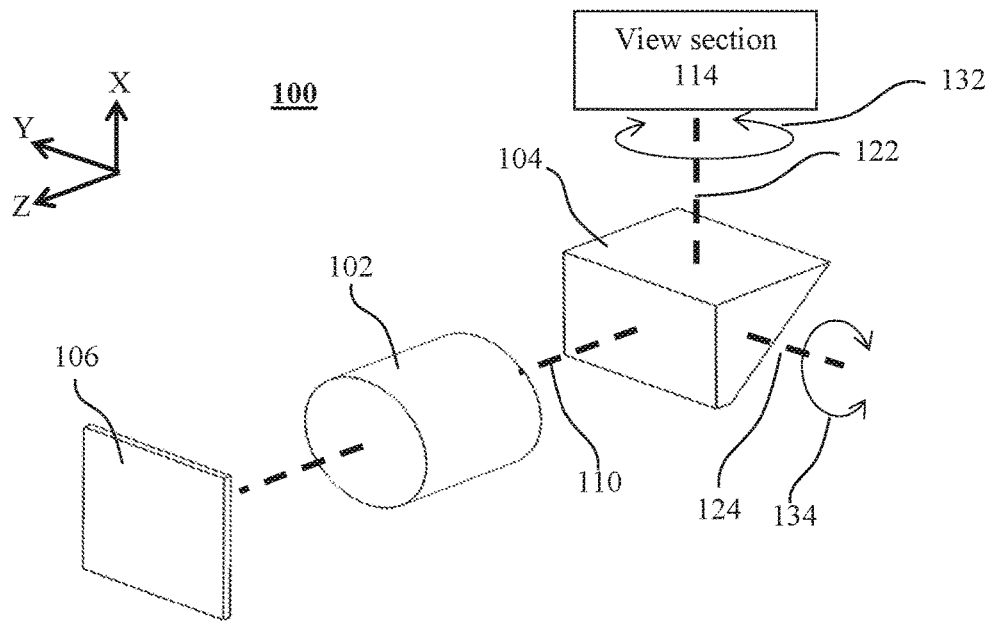
FIG. 1A illustrates a folded camera with an optical path folding element (OPFE) with an extended 2 degrees-of-freedom (DOF) rotation range, according to some examples of the presently disclosed subject matter.

FIG. 1A illustrates a folded camera 100 with a 2 degrees-of-freedom (DOF) optical path folding element (OPFE) with an extended rotation range, according to an example of the presently disclosed subject matter. An orthogonal X-Y-Z coordinate ("axis") system shown applies also to all following drawings. This coordinate system is exemplary only and should not be construed as limiting. In some examples, the term "extended rotation range" used herein is used to describe a rotation range larger than the 2-3 degrees necessary for another application, for example optical image stabilization (OIS). In an example, an extended rotation range may be a range equal to or greater than ±5 degrees in each DOF relative to an OPFE zero state (as defined below). According to another example, an extended rotation range may be a range equal to or greater than ±10 degrees in each DOF relative to an OPFE zero state (as defined below). According to yet another example, an extended rotation range may be a range between ±15-40 degrees in each DOF relative to an OPFE zero state (as defined below). The extended rotation range may or may not be equal in the two DOF. In an example, the extended rotation range may be twice or more in the yaw DOF than in the pitch DOF, because the optical effect (shift of image on the image sensor) of pitch rotation is double the optical effect of yaw rotation.

Camera 100 includes a lens assembly or lens module (or simply "lens") 102, an OPFE 104 and an image sensor 106. In general lens module 102 comprises a plurality of lens elements positioned along an optical axis, for example between 3 to 7 lens elements. In some examples, lens 102 has a fixed focal length "f". In other examples, lens 102 has a variable focal length (zoom lens). In some examples, lens 102 may be a lens designed for folded cameras described for example in co-owned U.S. Pat. No. 9392188. OPFE 104 has a reflection surface (e.g. it may be a minor or a prism).

OPFE 104 folds light from a first optical path 108 to a second optical path 110. First optical path 108 extends from the direction of a view section 114 (facing an object or scene) towards OPFE 104 and is substantially parallel to the X axis (in the exemplary coordinate system). Second optical path 110 extends from OPFE 104 towards image sensor 106 and is substantially parallel to the Z axis (in the exemplary coordinate system).

View section 114 may include, for example, one or more objects, a scene and/or a panoramic view, etc. According to the illustrated example, axis 110 is aligned with the optical axis of lens 102, and therefore is also referred to herein as "lens optical axis". Image sensor 106 may be aligned with a plane substantially perpendicular to axis 110 (a plane that includes the X and Y axes). Image sensor 106 may output an output image. The output image may be processed by an image signal processor (ISP—not shown), the processing including for example, demosaicing, white balance, lens shading correction, bad pixel correction and other processes that may be carried out by an ISP. In some embodiments, the ISP (or some functionalities of the ISP) may be part of image sensor 106.

It is noted that while the OPFE and some of the parts described below may be configured to rotate in two DOF, all the figures, the description and the directions therein show the OPFE in a "zero" state (without rotation) unless otherwise mentioned.

For the sake of clarity of the description and by way of a non-limiting example only, it is defined that at zero state the first optical path 108 extending from the direction of view section 114 towards the OPFE 104 is perpendicular to a zero plane. The term "zero plane" as used herein refers to an imaginary plane on which an actuator 202 described below is positioned and is parallel to the lens optical axis. For example, in a mobile phone, the zero plane is a plane parallel to the screen of the phone.

Furthermore, in zero state the reflecting surface of the OPFE is positioned such that light along the first optical path 108 is redirected to a second optical path 108 that coincides with lens optical axis 110. Notably, the above definition is assumed to be true for the center of the field of view (FOV).

Yaw rotation can be defined as rotation around an axis substantially parallel to the first optical path in zero state. Pitch rotation can be defined as rotation around an axis substantially perpendicular to the yaw rotation axis and the lens optical axis.

In some examples, camera 100 may further include a focus or autofocus (AF) mechanism (not shown), allowing to move (or "shift" or "actuate") lens 102 along axis 110. The AF mechanism may be configured to adjust the focus of the camera on view section 114. Adjusting the focus on view section 114 may bring into focus one or more objects and/or take out of focus one or more objects that may be part of view section 114, depending on their distance from OPFE 104. For simplicity, the description continues with reference only to AF mechanisms, with the understanding that it also covers regular (manual) focus.

An AF mechanism may comprise an AF actuation mechanism. The AF actuation mechanism may comprise a motor that may impart motion such as a voice coil motor (VCM), a stepper motor, a shape memory alloy (SMA) actuator and/or other types of motors. An AF actuation mechanism that comprises a VCM may be referred to as a "VCM actuator". Such actuation mechanisms are known in the art and disclosed for example in Applicant's co-owned international patent applications PCT/IB2015/056004 and PCT/IB2016/055308. In some embodiments, camera 100 may include an optical image stabilization (OIS) actuation mechanism (not shown) in addition to, or instead of, the AF actuation mechanism. In some embodiments, OIS may be achieved by shifting lens 102 and/or image sensor 106 in one or more directions in the X-Y plane, compensating for tilt of camera 100 around the Z and Y directions. A three-degrees of freedom (3-DOF) OIS and focus actuation mechanism (which performs two movements for OIS and one for AF) may be of VCM type and known in the art, for example as disclosed in international patent application PCT/US2013/076753 and in U.S. patent application 2014/0327965. In other embodiments, OIS may be achieved by shifting the lens in one direction (i.e. the Y direction), perpendicular to both the first and second optical paths, compensating for tilt of camera 100 around the Z direction (lens optical axis). In this case, a second OIS operation, compensating for tilt of camera 100 around the Z direction may be done by tilting the OPFE around the Y axis, as demonstrated below. More information on auto-focus and OIS in a compact folded camera may be found in Applicant's co-owned international patent applications PCT/IB2016/052143, PCT/IB2016/052179 and PCT/IB2016/053335.

Figure 1B:
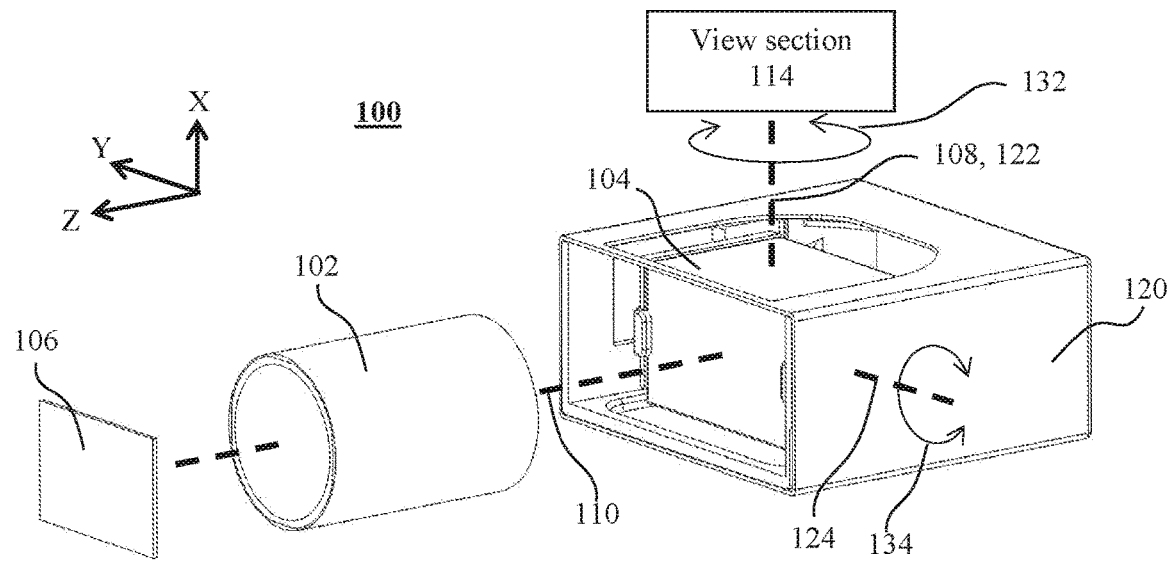
FIG. 1B shows the folded camera of FIG. 1A with an OPFE actuator, according to some examples of the presently disclosed subject matter.

Camera 100 is designed with a capability to rotate OPFE 104 with at least two DOF (2-DOF) in an extended rotation range. Rotation can be done for example using OPFE actuator 120, seen in FIG. 1B. Two-DOF rotation may be used to describe rotation of the prism around two axes (each axis being a DOF); in camera 100, the degrees of freedom are a yaw rotation 132 around yaw rotation axis 122 which is parallel to first optical path 108 (X axis) when in zero state as defined above, and a pitch rotation 134 around a pitch rotation axis 124 which is parallel to the Y axis. In camera 100, yaw rotation axis 122 and pitch rotation axis 124 may intersect, which may reduce coupling between a pitch sensing mechanism and yaw rotation, as described below with reference to FIG. 9. In camera 100, lens optical axis 110 intersects the intersection point of yaw rotation axis 122 and pitch rotation axis 124. In other embodiments, this may not be the case.

Figure 1C:
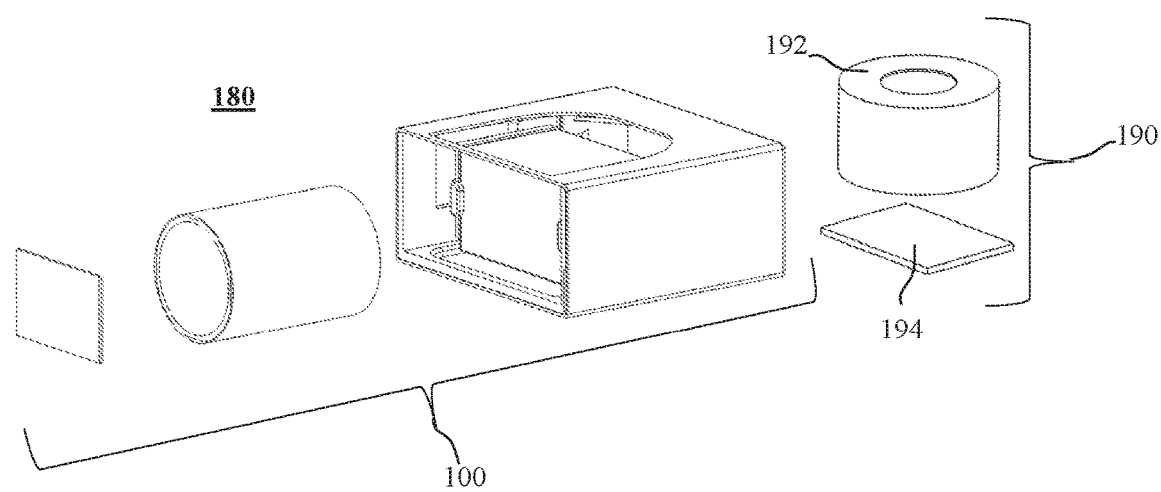
FIG. 1C shows a dual-camera the includes a folded camera as in FIG. 1A together with an upright (non-folded) camera, according to according to some examples of the presently disclosed subject matter.

As shown in FIG. 1C, camera 100 may be a part of a dual-camera 180. Dual-camera 180 comprises camera 100 and an upright camera 190. Upright camera 190 includes a lens 192 and an image sensor 194. Upright camera 190 may further include other parts such as a shield, a focus or AF mechanism, and/or an OIS mechanism (all of which are not shown), as known in the art. Cameras 100 and 190 may share some or all of respective fields of view (FOVs). According to some examples, camera 190 may have a wider FOV than camera 100. In such an example, camera 100 will be referred as a "Tele camera", while camera 190 will be referred as a "Wide camera". In such an example, a scanning mechanism of camera 100 may be used to cover some or all of the FOV of camera 190, as explained in the description below of FIGS. 14A-14C. In other examples, camera 100 may be a part of a multiple aperture camera (multi-camera) comprising more than two cameras, e.g. comprising two or more additional upright and/or two or more additional folded cameras. Notably, while characterized by extended rotation ranges, camera 100 and actuator 120 may also be capable of performing small range (1-2 degree) actuations with high accuracy, which enable OIS around any position in the extended rotation range.

Figure 2A:
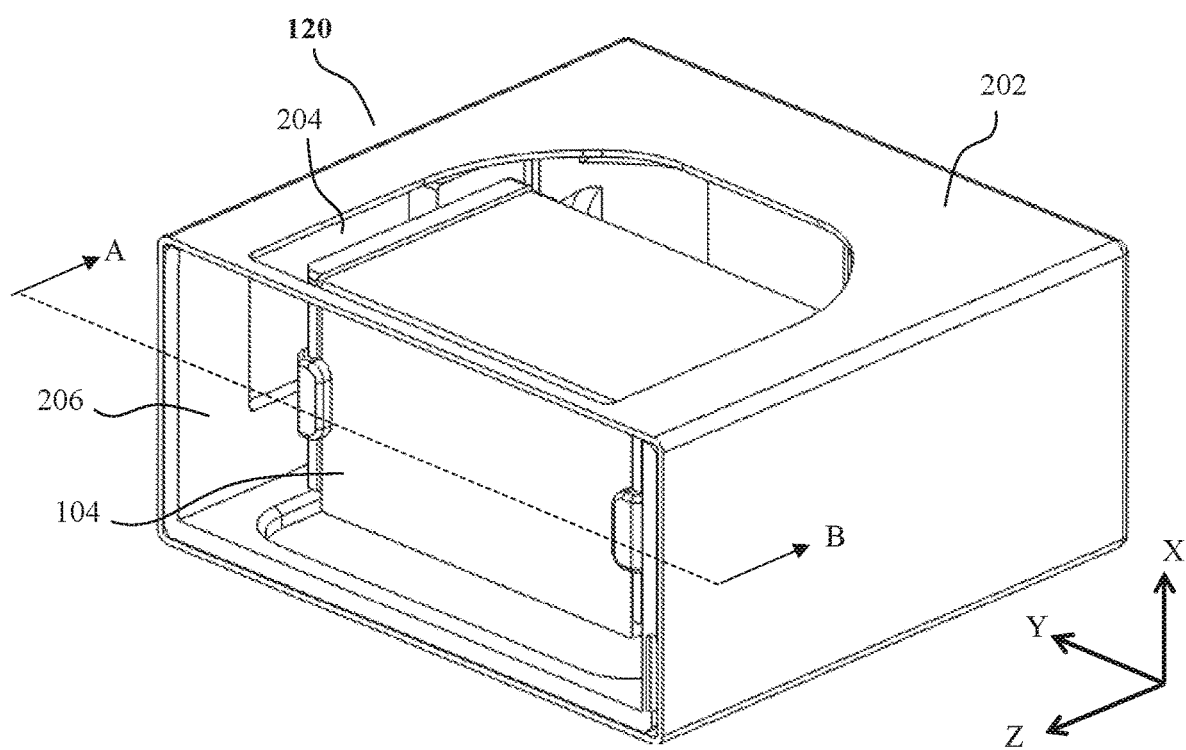
FIG. 2A shows an OPFE actuator of the folded camera of FIG. 1 in an isometric view, according to some examples of the presently disclosed subject matter.
Figure 2B:
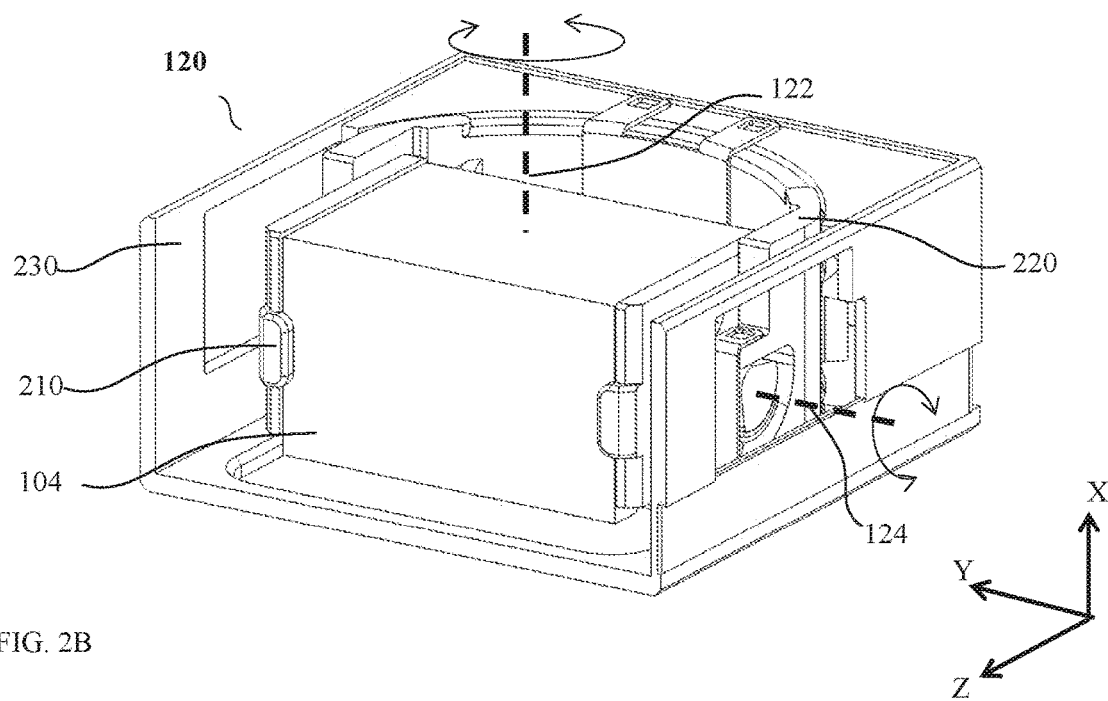
FIG. 2B shows the actuator in FIG. 2A without a shield, according to some examples of the presently disclosed subject matter.

FIGS. 2A-B show OPFE actuator 120 with more details according to some non-limiting examples of the presently disclosed subject matter. FIG. 2A shows OPFE actuator 120 in an isometric view. OPFE actuator 120 may be covered by a shield 202 with an opening 204 through which light can enter into OPFE 104 and an opening 206 through which light can exit from OPFE 104. FIG. 2B shows actuator 120 without shield 202. Actuator 120 further includes a bottom actuated sub-assembly 220 (also referred to herein as "yaw sub-assembly" or "first sub-assembly"), a top actuated sub-assembly 210 (also referred to herein as "pitch sub-assembly" or "second sub-assembly"), and a stationary sub-assembly 230. Top actuated sub-assembly 210 may be operable to be rotated, and thus rotate OPFE 104, around the pitch rotation axis (parallel to the Y axis) relative to bottom actuated sub-assembly 220 (pitch rotation 134), as described below. Bottom actuated sub-assembly 220 may be operable to be rotated, and thus rotate OPFE 104, around the yaw rotation axis (parallel to the X axis) relative to stationary sub-assembly 230 (yaw rotation 132), as described below.

As described in more detail below, according to one example, the bottom (yaw) actuated sub-assembly 220 rotates relative to a stationary sub-assembly and the top (pitch) actuated sub-assembly 210 rotates relative to the bottom sub-assembly, thus the bottom sub-assembly acts as a master and the top sub-assembly acts as a slave. Applicant has found that this design, with the bottom actuated sub-assembly used for yaw rotation and the top actuated sub-assembly used for pitch rotation, and with the bottom actuated sub-assembly serving as a master and the top actuated sub-assembly serving as a slave, enables to maintain a lower overall height of the actuator and thus to mitigate a penalty on the folded camera height.

Figure 3A:
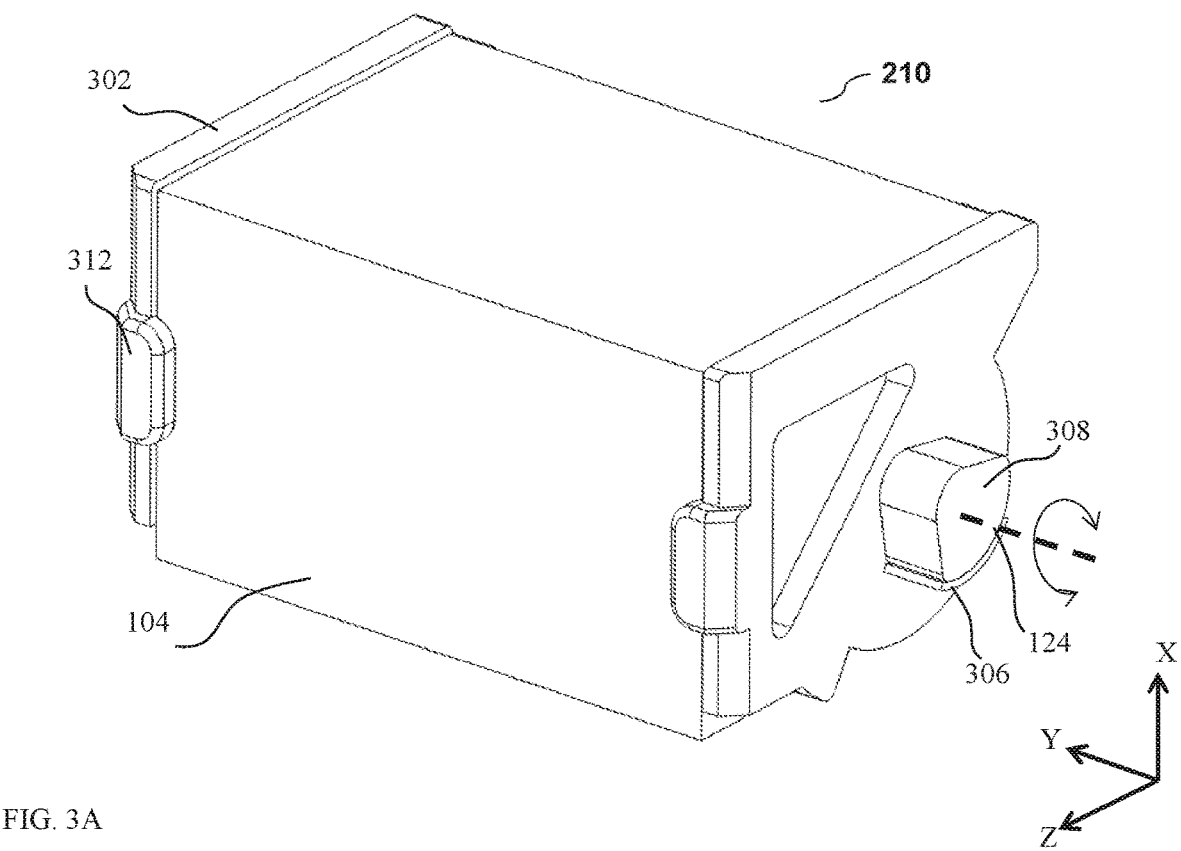
FIG. 3A shows a top actuated sub-assembly of the actuator of FIGS. 2A and 2B from one side, according to some examples of the presently disclosed subject matter.
Figure 3B:
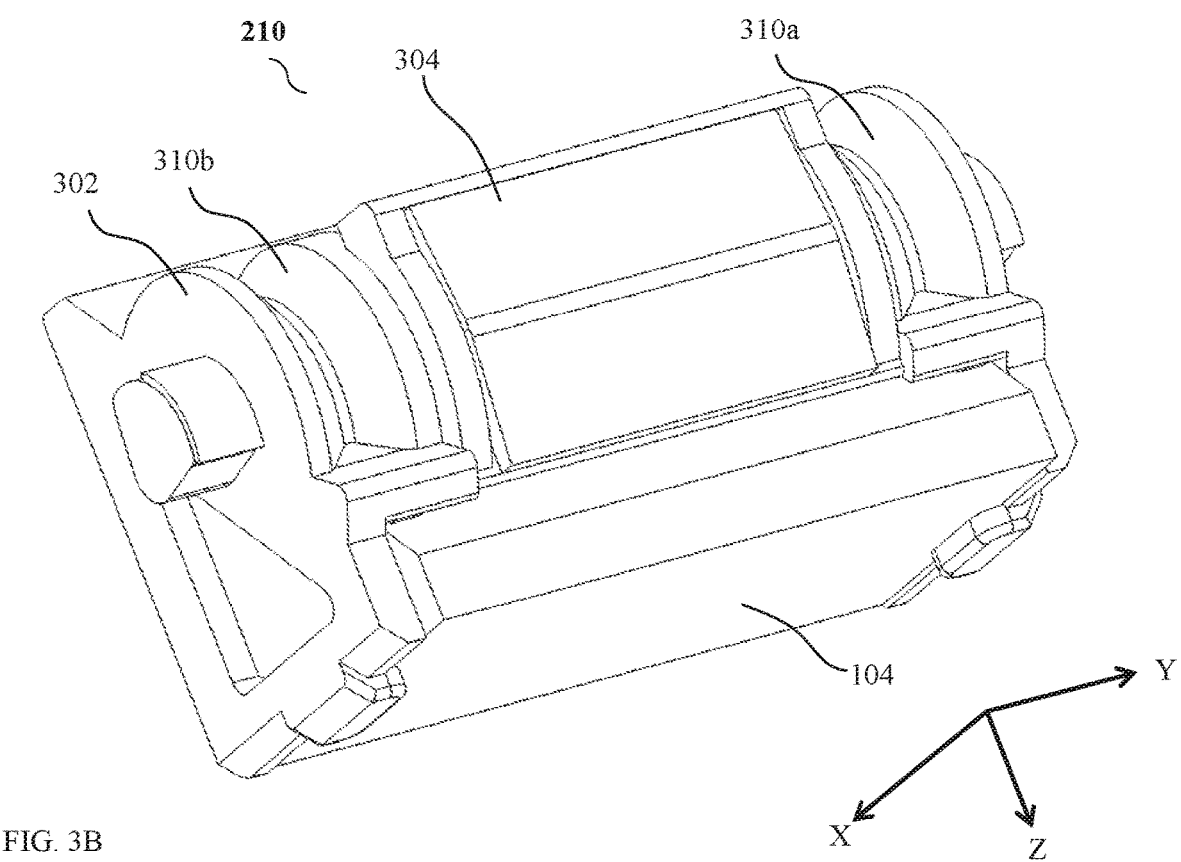
FIG. 3B shows the top actuated sub-assembly of FIG. 3A from an opposite side, according to some examples of the presently disclosed subject matter.
Figure 3C:
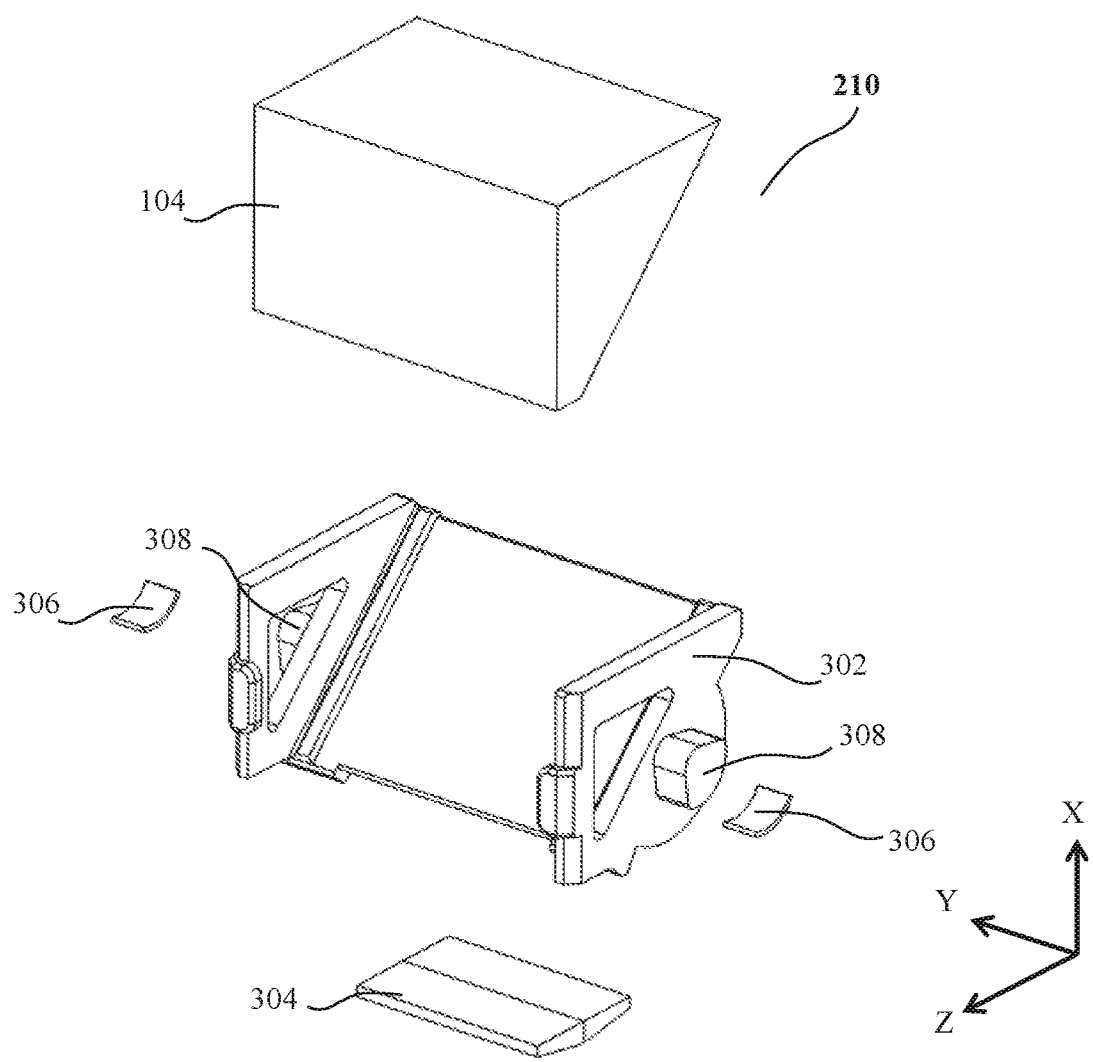
FIG. 3C shows the top actuated sub-assembly of FIG. 3A in an exploded view, according to some examples of the presently disclosed subject matter.

FIGS. 3A-C show top (pitch) actuated sub-assembly 210 with more details in an isometric view from one side (FIG. 3A), an isometric view from another side (FIG. 3B), and an exploded view (FIG. 3C), according to some non-limiting examples of the presently disclosed subject matter. Top actuated sub-assembly 210 includes an OPFE holder (or carrier) 302 that can be made, for example, by a plastic mold that fits the shape of OPFE 104. Top actuated sub-assembly 210 further includes a permanent (fixed) pitch magnet 304. Pitch magnet 304, as well as all other magnets in this application, can be for example a permanent magnet, made from a neodymium alloy (e.g. $Nd_2Fe_{14}B$) or a samarium-cobalt alloy (e.g. $SmCo_5$), and can be made by sintering. According to one example, pitch magnet 304 is fixedly attached (e.g. glued) to OPFE carrier 302 from below (negative X direction in FIG. 3A). Hereinafter, the term "below" used with reference to the position of OPFE 104 refers to a side of the OPFE opposite to the side facing the view section (in the negative X direction relative to the view). Details of pitch magnet 304 and its operation are given below. In some examples, OPFE carrier 302 includes (e.g. is molded with) two pins 308.

Sub-assembly 210 may further include two ferromagnetic yokes 306. Ferromagnetic yokes 306 may be attached (e.g. glued) to OPFE holder 302 on pins 308. Ferromagnetic yokes 306 may be made of a ferromagnetic material (e.g. iron) and have an arced (curved) shape with a center on pitch rotation axis 124. Ferromagnetic yokes 306 are pulled by pitch-pull magnets 408 (see FIGS. 4A, 4C) to attach top actuated sub-assembly 210 to bottom actuated sub-assembly 220 as described below with reference to FIGS. 5A-5C. OPFE holder 302 may further include (e.g. is molded with) two parallel arc-shaped (curved) grooves 310a and 310b (FIG. 3B) positioned at two opposite sides of OPFE holder 302, each arc-shaped groove having an angle a'>a, where angle a is a desired pitch stroke, as defined by optical needs. Angle a' is shown in FIG. 5B. Arc-shaped grooves 310a and 310b have a center of curvature on pitch rotation axis 124 (see FIGS. 3A, 5A, 5B). OPFE holder 302 further includes (e.g. is molded with) two stoppers 312 (FIG. 3A) positioned at two opposite sides of OPFE holder 302. Stoppers 312 are used to stop OPFE 104 in a required position.

Figure 4A:
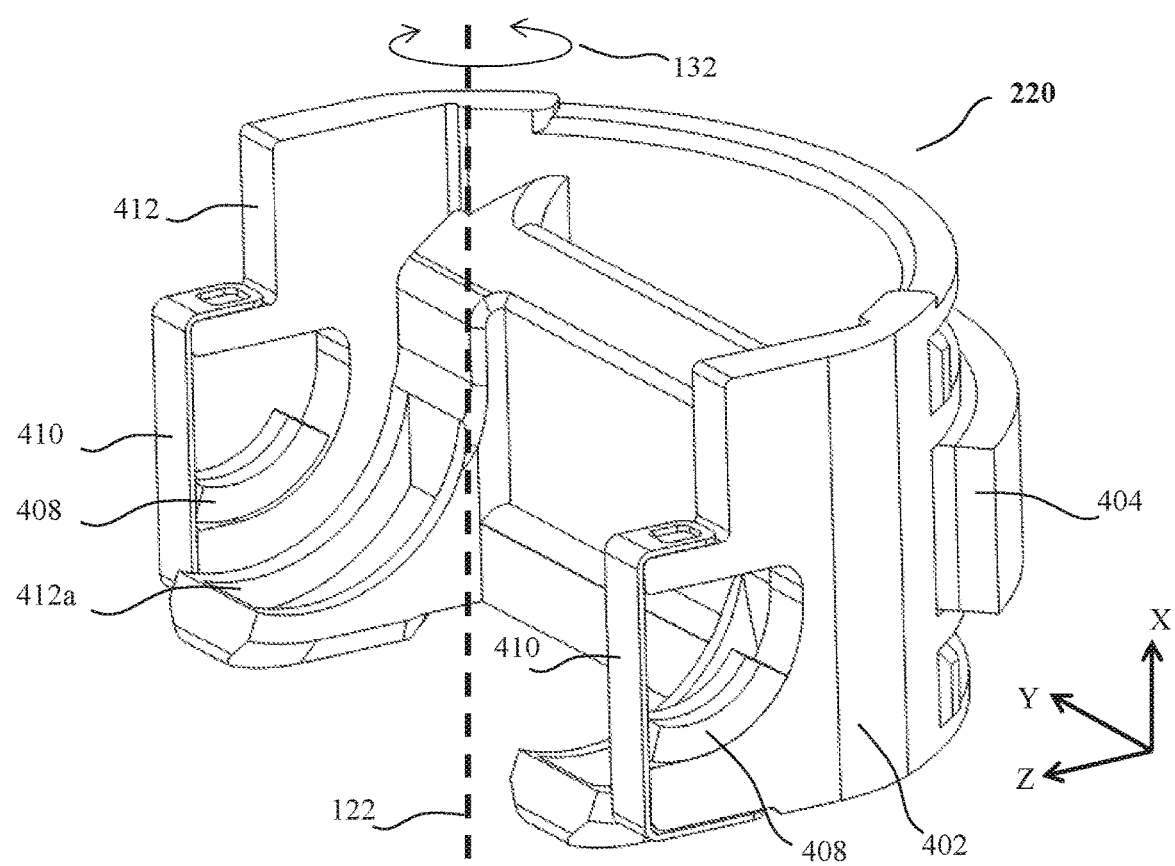
FIG. 4A shows a bottom actuated sub-assembly of the actuator of FIGS. 2A and 2B from one side, according to some examples of the presently disclosed subject matter.
Figure 4B:
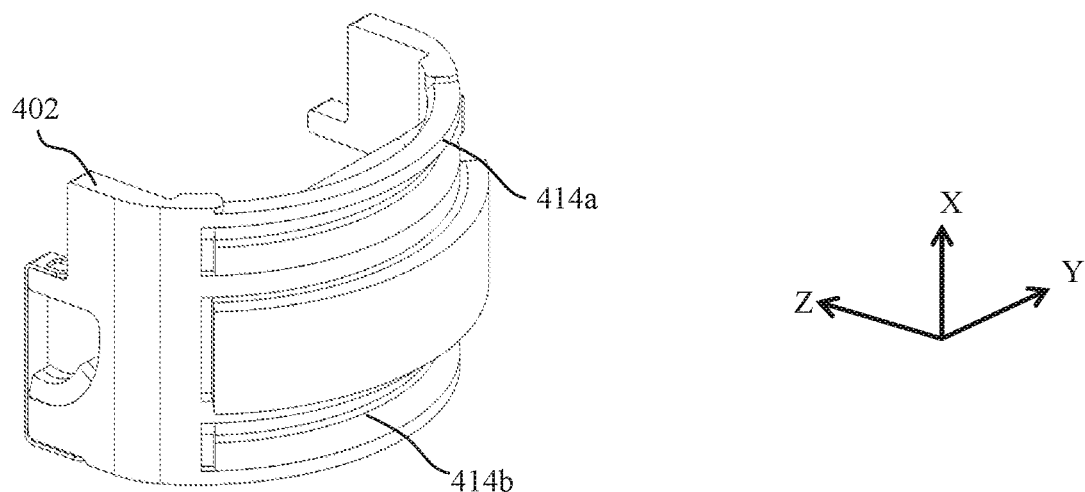
FIG. 4B shows the bottom actuated sub-assembly of FIG. 4A from an opposite side, according to some examples of the presently disclosed subject matter.
Figure 4C:
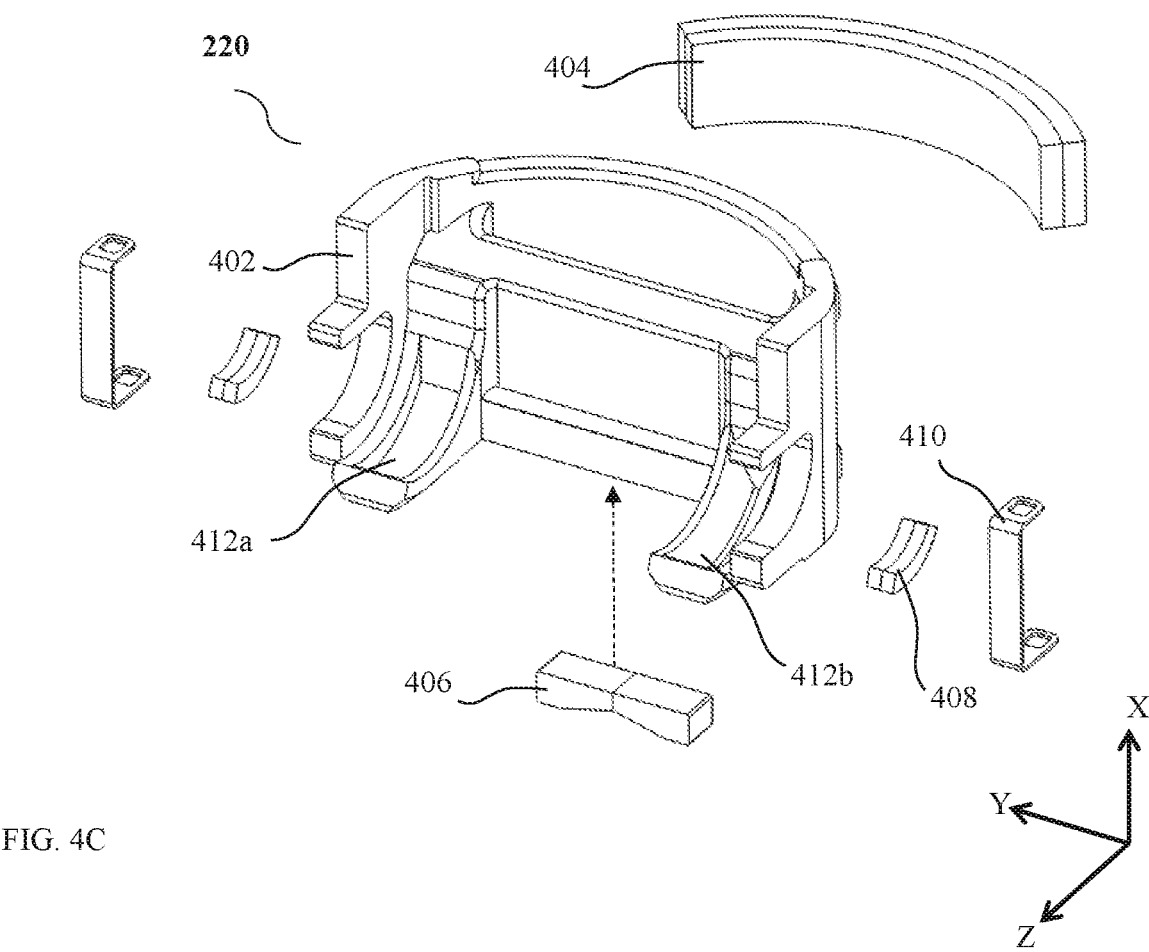
FIG. 4C shows the bottom actuated sub-assembly in an exploded view, according to some examples of the presently disclosed subject matter.

FIGS. 4A-C show bottom (yaw) actuated sub-assembly 220 with more details in an isometric view from one side (FIG. 4A), an isometric view from another side (FIG. 4B), and an exploded view (FIG. 4C). Bottom actuated sub-assembly 220 includes a middle moving frame 402 which can be made, for example, by a plastic mold. Bottom actuated sub-assembly 220 further included four permanent (fixed) magnets: a yaw actuation magnet 404, a yaw sensing magnet 406, and two pitch-pull magnets 408. All magnets are fixedly attached (e.g. glued) to middle moving frame 402. Notably, yaw magnet 404 is located on a side of the OPFE that is opposite to the side facing lens module 102 in camera 100. Details of all magnets and their operation are given below.

Figure 7:
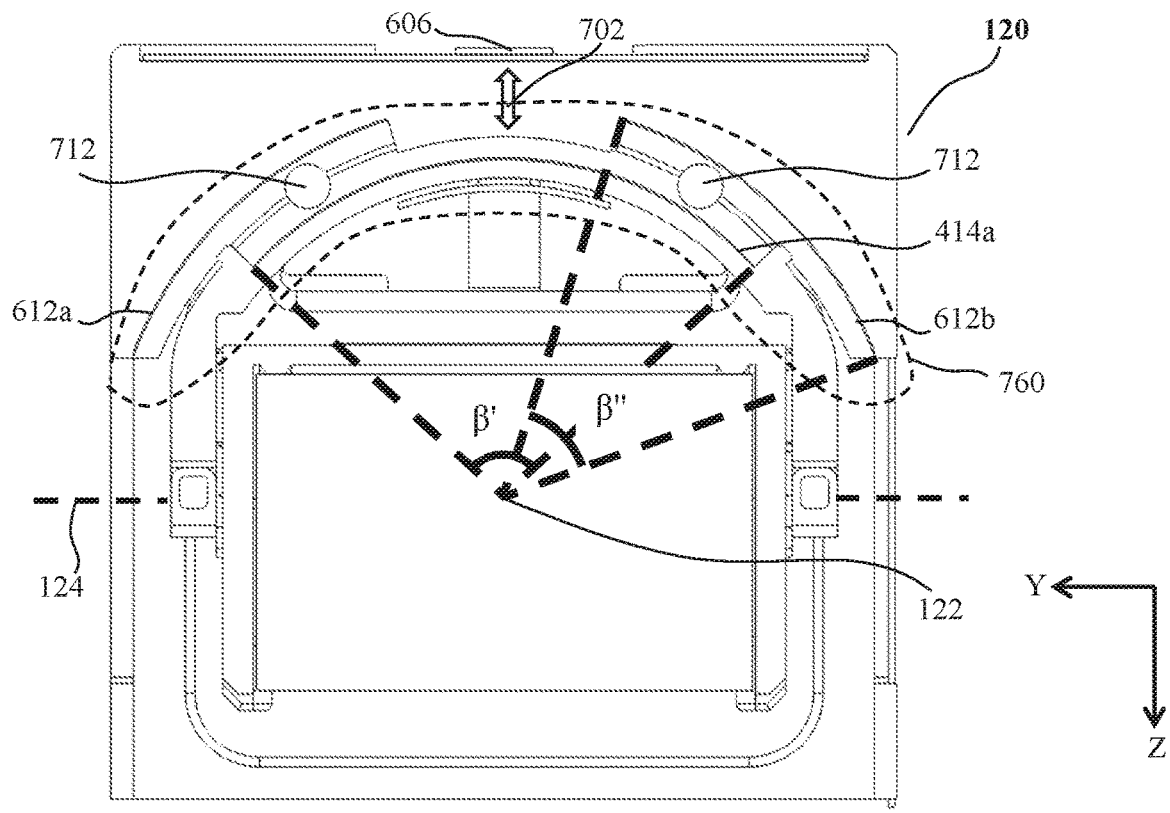
FIG. 7 shows the actuator of FIG. 2B along a cut along line A-B shown in FIG. 2A, according to some examples of the presently disclosed subject matter.

Bottom actuated sub-assembly 220 further includes two stoppers 410, made for example from a non-magnetic metal. Stoppers 410 are fixedly attached (e.g. glued) to middle moving frame 402. Stoppers 410 help to prevent top actuated sub-assembly 210 from detaching from bottom actuated sub-assembly 220 in case of a strong external impact or drop, as described in more detail below. Middle moving frame 402 includes (i.e. is molded with) two parallel arc-shaped (curved) grooves 412 (FIG. 4A) positioned at two opposite sides of middle moving frame 402, each arc-shaped groove having an angle $\alpha''>\alpha$. Angle $\alpha''$ is shown in FIG. 5B. Arc-shaped grooves 412 have a center of curvature on yaw rotation axis 122 (FIG. 5B) in common with arc shaped grooves 310. Middle moving frame 402 further includes (e.g. is molded with) two parallel arc-shaped (or "curved") grooves 414 (FIG. 4B) positioned at a back side of middle moving frame 402 (negative Z axis), each arc-shaped groove having an angle ($\beta'>\beta$, where angle $\beta$ is a required yaw stroke, as defined by optical needs. Angle $\beta$ is shown in FIG. 7. Arc-shaped grooves 414 have a center of curvature on yaw rotation axis 122 (FIG. 7).

Figure 5A:
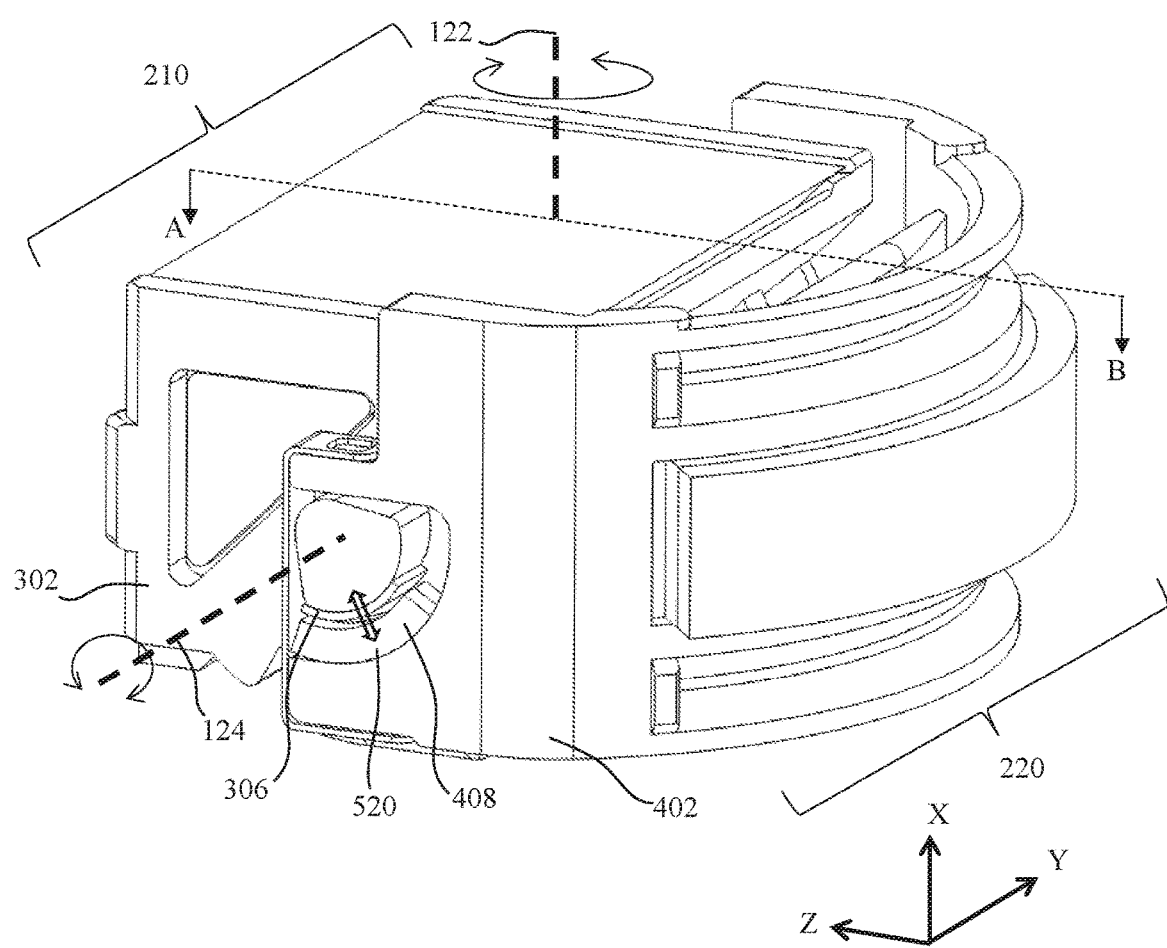
FIG. 5A shows the top and bottom actuated sub-assemblies installed together in an isometric view, according some examples of the presently disclosed subject matter.
Figure 5B:
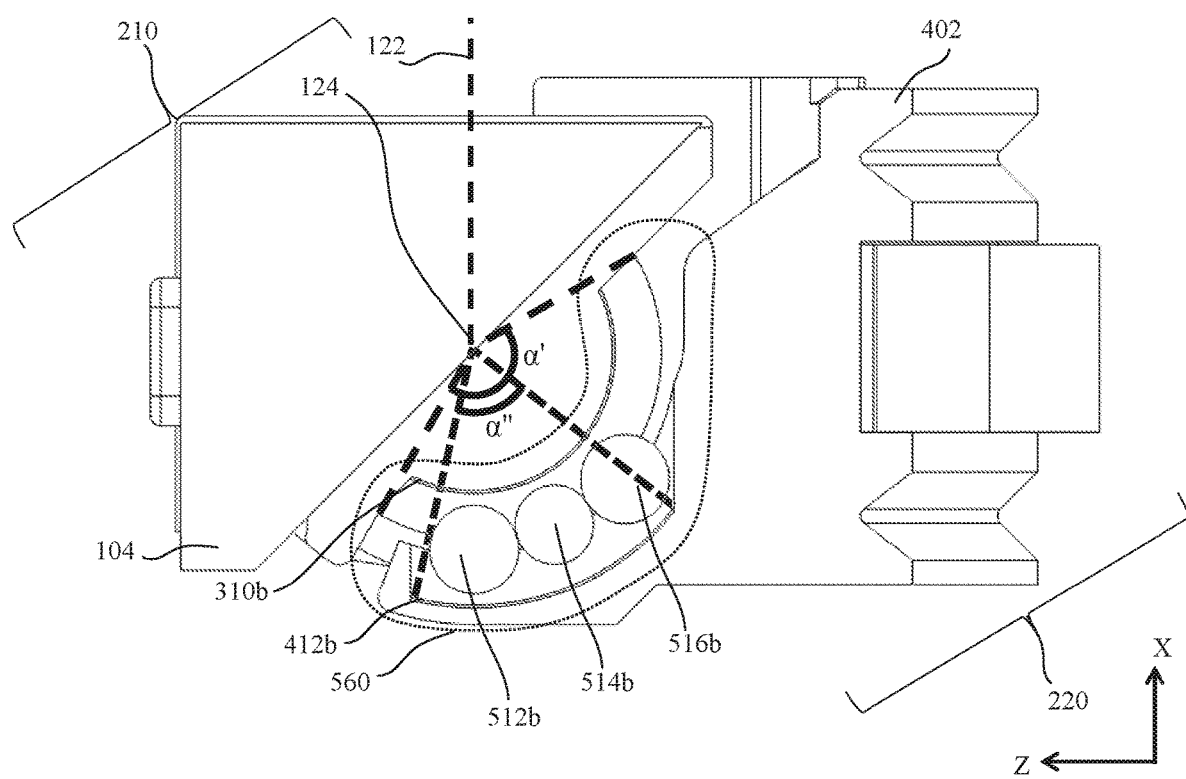
FIG. 5B shows the top and bottom actuated sub-assemblies installed together in a cut along a line A-B shown in FIG. 5A, according to some examples of the presently disclosed subject matter.

FIGS. 5A-B show top actuated sub-assembly 210 and bottom actuated sub-assembly 220 installed together. FIG. 5A shows an isometric view and FIG. 5B shows a cut along line A-B in FIG. 5A. The figures also show various elements described above. FIG. 5B shows actuator 120 with three balls 512a, 514a and 516a positioned in the space between grooves 310a and 412a, and three balls 512b, 514b and 516b positioned in the space between grooves 310b and 412b. FIG. 5B shows only balls 512b, 514b and 516b and grooves 310b and 412b, while balls 512a, 514a and 516a and grooves 310a and 412a are not seen (being in the unseen back side of the drawing), with understanding of them being symmetric along plane Z-Y. The number of balls (here 3) shown in the drawing is for the sake of example only and should not be construed as limiting. In other embodiments, an actuator such as actuator 120 may have more or fewer of three balls (e.g. 2-7 balls) in the space between adjacent grooves. The balls may be made of Alumina, another ceramic material, metal, plastic or other suitable materials. The balls may have for example a diameter in the range of 0.3-1 mm. In actuator 120, grooves 310a, 301b, 412a, 412b and balls 512a, 512b, 514a, 514b, 516a and 516b form a curved ball-guided mechanism 560 operative to impart a rotation or tilt movement to an optical element (e.g. OPFE 104) upon actuation by the VCM actuator (see below). More details on ball-guided mechanisms in actuators may be found in co-owned international patent applications PCT/IB2017/052383 and PCT/IB2017/054088.

In some embodiments, balls having different sizes (e.g. two different ball sizes) may be used to provide smoother motion. The balls can be divided into a large diameter (LD) group and a small diameter (SD) group. The balls in each group may have the same diameter. LD balls may have for example a 0.1-0.3 mm larger diameter than SD balls. A SD ball may be positioned between two LD balls to maintain the rolling ability of the mechanism. For example, balls 512b and 516b may be LD balls and ball 514b may be a SD ball (and similarly for balls 512a-516a). As described above, two metallic ferromagnetic yokes 306 that may be fixedly attached to OPFE holder 302 face two pitch-pull magnets 408 that may be attached to middle frame 402. Ferromagnetic yokes 306 may pull magnets 408 (and thus pull top actuated sub-assembly 210 to bottom actuated sub assembly 220) by magnetic force and hold a curved ball-guided mechanism 560 from coming apart. The magnetic force (e.g. acting between yoke 306 and magnets 408) that is used for preventing two parts of a moving mechanism to be detached is referred to herein as "pre-load force". A pitch-pull magnet 408 and its respective yoke 306 may be referred to as "first magnet-yoke pair". Ferromagnetic yokes 306 and pitch-pull magnets 408 both have arc shapes, with a center on pitch rotation axis 124. The magnetic direction of pitch-pull magnets 408 is along pitch rotation axis 124, e.g. with a north pole toward OPFE 104 and a south pole away from OPFE 104. Due to the geometric and magnetic design presented, the magnetic force (pre-load force) between ferromagnetic yokes 306 and pitch-pull magnets 408 is kept substantially in a radial direction 520 with a center on pitch rotation axis 124, and negligible tangent force, at all rotation positions, as can be seen in FIG. 5A.

Balls 512a-516a and 512b-516b prevent top actuated sub-assembly 210 from touching bottom actuated sub-assembly 220. Top actuated sub-assembly 210 is thus confined with a constant distance from bottom actuated sub-assembly 220. Curved ball-guided mechanism 560 further confines top actuated sub-assembly 210 along pitch rotation axis 124. Top actuated sub-assembly 210 can only move along the path defined by curved ball-guided mechanism 560, namely in a pitch rotation 134 around pitch rotation axis 124.

Figure 6A:
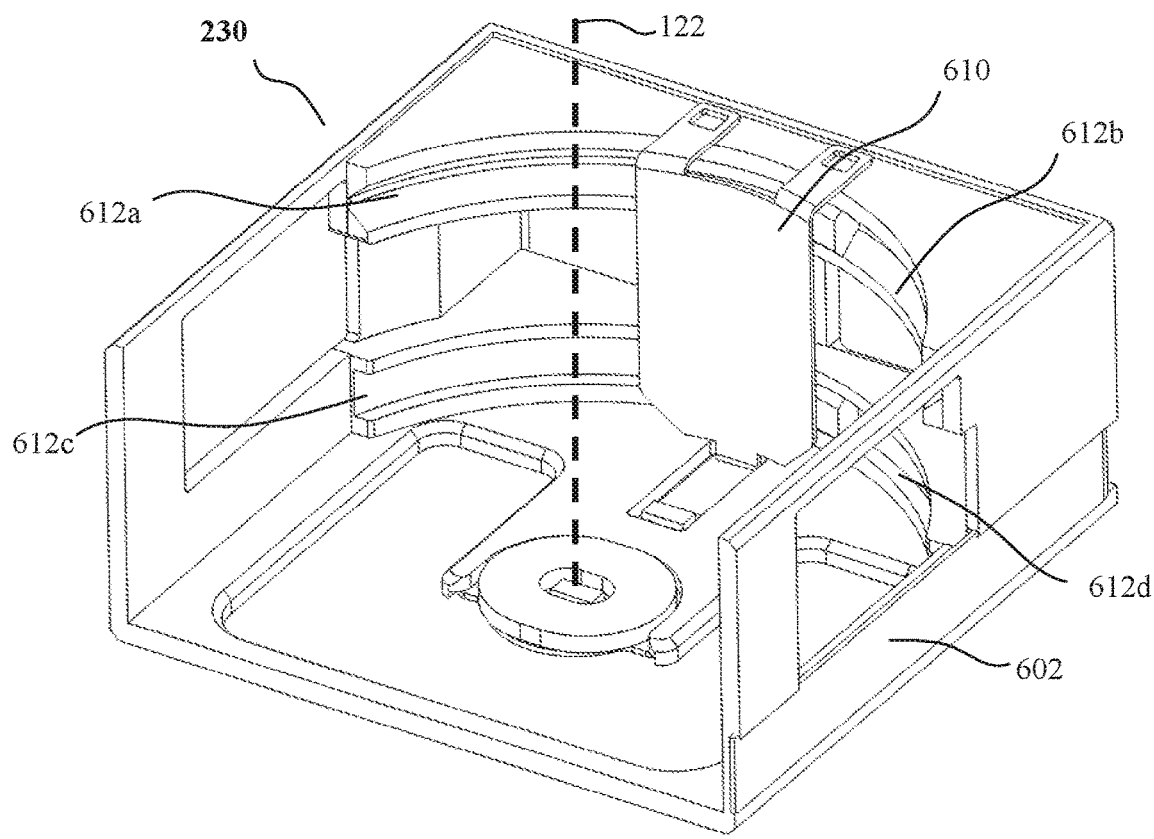
FIG. 6A shows a stationary sub-assembly of the actuator of FIGS. 2A and 2B from one side, according to some examples of the presently disclosed subject matter.
Figure 6B:
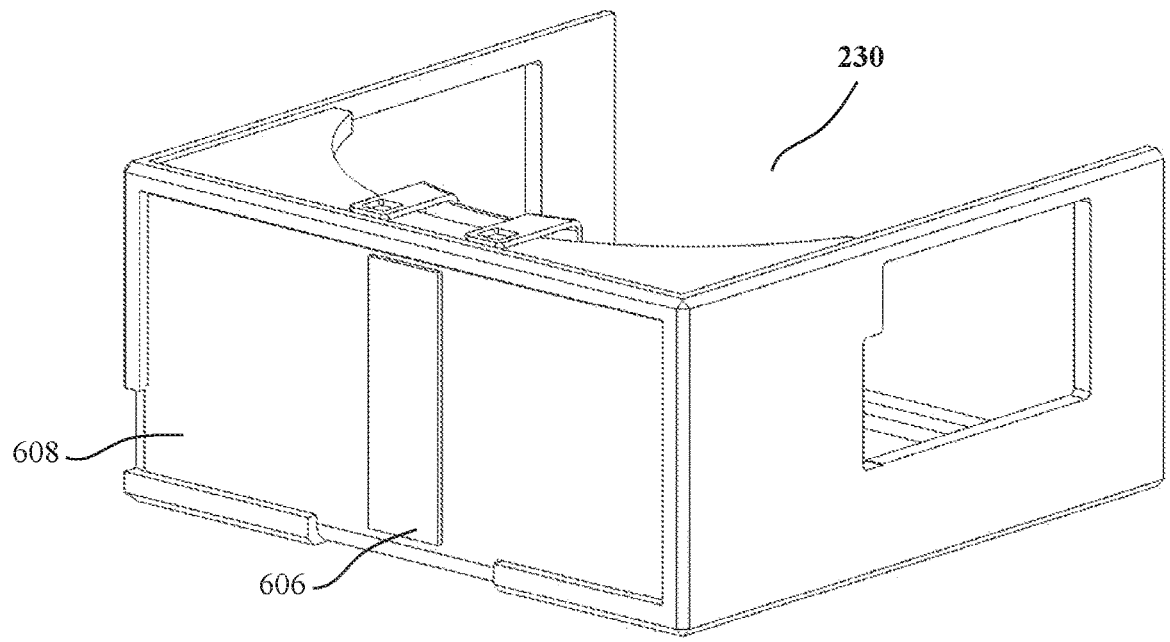
FIG. 6B shows the stationary sub-assembly of FIG. 6A from an opposite side, according to some examples of the presently disclosed subject matter.
Figure 6C:
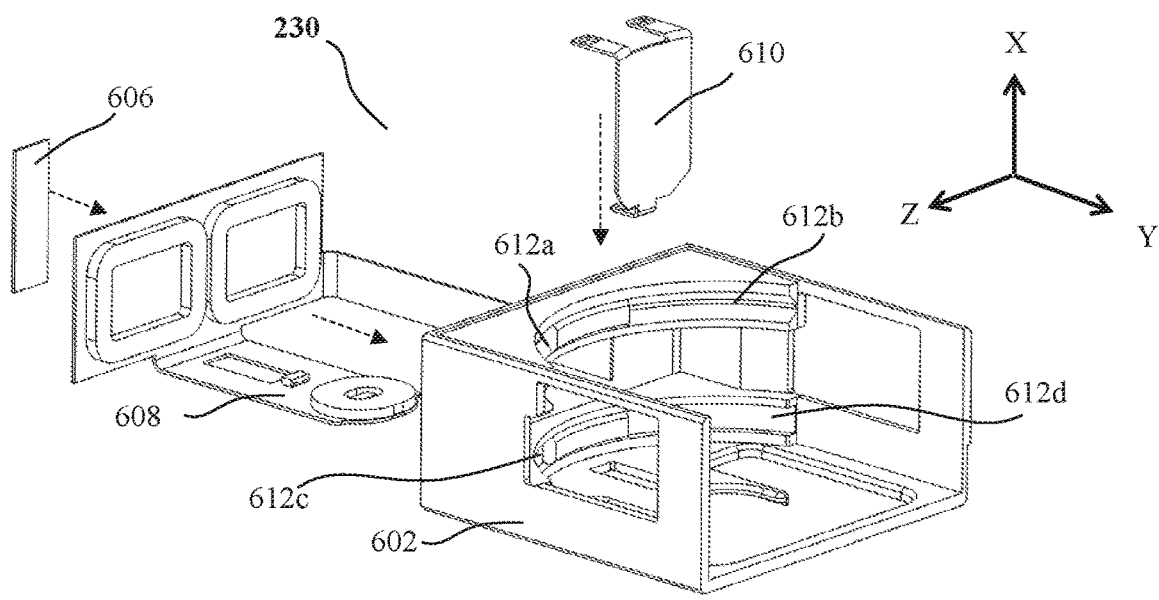
FIG. 6C shows the stationary actuated sub-assembly in an exploded view, according to some examples of the presently disclosed subject matter.

FIGS. 6A-C show stationary sub-assembly 230 with more details, in an isometric view from one side (FIG. 6A), an isometric view from another side (FIG. 6B) and an exploded view (FIG. 6C). Stationary sub-assembly 230 includes a base 602 that can be made, for example, by plastic mold. Stationary sub-assembly 230 further includes electronic circuitry 608 attached to base 602, shown in FIG. 6C. Details of electronic circuitry 608 are given below with reference to FIG. 8. Stationary sub-assembly 230 further includes a ferromagnetic yoke 606. Ferromagnetic yoke 606 is made by ferromagnetic material (e.g. iron) and is pulled by yaw actuation magnet 404 (see FIGS. 6B and 7C) to attach bottom actuated sub-assembly 220 to stationary sub-assembly 230 as described in more detail below. Ferromagnetic yoke 606 and yaw actuation magnet 404 may be referred to as "second magnet-yoke pair".

Stationary actuated sub-assembly 230 further include a stopper 610. Stopper 610 is made for example from a non-magnetic metal. Stopper 610 is attached (e.g. glued) to based 602. Stopper 610 helps to prevent bottom actuated sub-assembly 220 from detaching from base 602 in case of a strong external impact or drop, as described in more detail below. In some examples, base 602 includes (i.e. is molded with) two parallel arc-shaped (curved) grooves 612a-d (FIG. 6A), each arc-shaped groove having an angle β">β, where angle β is a required tilt stroke, as defined by optical needs. Angle β" is shown in FIG. 7. Arc-shaped grooves 612a-d may further include a center of curvature on yaw rotation axis 122 (FIG. 2C, 6A and 7), in common with arc-shaped grooves 414a-b.

FIG. 7 shows actuator 120 without the shield along a cut along line A-B seen in FIG. 2A. Grooves 612a-d are shown to share a center with grooves 414a-b on yaw rotation axis 122 (612c and 612d, which are shown in FIGS. 6B and 6C are hidden in FIG. 7). Angles β' and β"are demonstrated. Grooves 612a-b are adjacent to groove 414a while grooves 612c-d are adjacent to groove 414b. Four balls 712 (two are shown in FIG. 7) are positioned between adjacent groove pairs 612a and 414a, 612b and 414a, 612c and 414b, and 612d and 414b, one ball between each adjacent groove pair. In other embodiments, actuator 120 may have more than one ball pair in each adjacent groove pair, e.g. in the range of 1-4 balls. The considerations for size and materials of all balls are similar to those described above. Grooves 414a-b, 612a-d and balls 712 form a second curved ball-guided mechanism 760 of actuator 120. As shown in FIG. 6 and FIG. 7, the second curved ball-guided mechanism is situated such that the grooves 612 for rotating around the yaw axis are located behind OPFE 104 i.e. in the positive direction along the Z axis relative to OPFE 104 (a side opposite to the side facing the lens module).

As described above, ferromagnetic yoke 606 is fixedly attached to base 602 facing magnet 404 (illustrated for example in FIG. 4a and FIG. 4c). Ferromagnetic yoke 606 pulls magnet 404 (and thus pulls bottom actuated sub-assembly 220) to stationary sub-assembly 230 by magnetic force 702 (pre-load force) and thus holds curved ball-guided mechanisms 760 from coming apart. The direction of magnetic force 702 is marked in FIG. 7 as the Z direction. Balls 712 prevent bottom actuated sub-assembly 220 from touching stationary sub-assembly 230. Bottom actuated sub-assembly 220 is thus confined with a constant distance from stationary sub-assembly 230. Second curved ball-guided mechanism 760 further confines bottom actuated sub-assembly 220 along the Y-axis. Bottom actuated sub-assembly 220 can only move along the path defined by the curved ball-guided mechanism 760, namely in a yaw rotation around yaw rotation axis 122.

The curved ball-guided mechanisms 560 and 760 disclosed herein provides flexibility when defining the pitch and yaw rotation axes respectively, as the curve can be adapted to the required rotation axis. Furthermore, curved ball-guided mechanisms 560 and 760 enable to execute movement of the top actuated sub-assembly and the bottom actuated sub-assembly by rolling over the balls confined within the grooves (rails) along the path prescribed by the grooves, and thus help to reduce or eliminate friction that may otherwise exist during movement between the balls and the moving parts.

Figure 8:
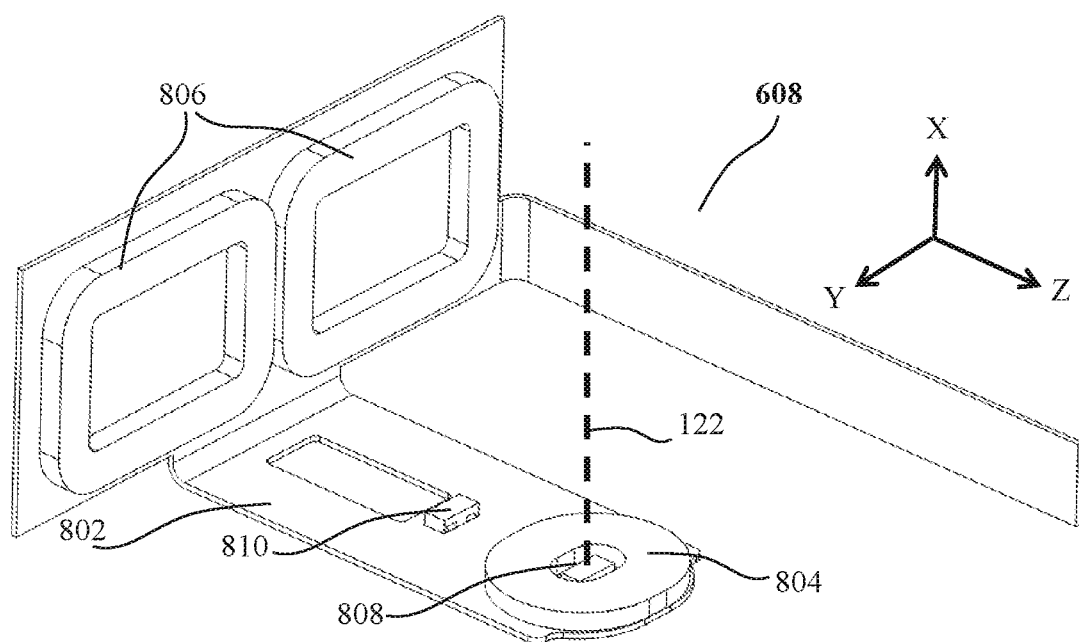
FIG. 8 shows details of an electronic circuitry included in the stationary sub-assembly of FIGS. 6A-6C, according to some examples of the presently disclosed subject matter.

FIG. 8 shows electronic circuitry 608 with more details, according to some examples of the presently disclosed subject matter. Electronic circuitry 608 includes a printed circuit board (PCB) 802 and may include processing circuitry. PCB 802 allows sending input and output currents to coils 806 and 804 and to Hall bar elements 808 and 810 (described below), the currents carrying both power and electronic signals needed for operation. PCB 802 may be connected electronically to host camera (camera 100 or similar cameras) or host device (e.g. phone, computer, not shown) e.g. by wires (not shown). PCB 802 may be a flexible PCB (FPCB) or a rigid flex PCB (RFPCB) and may have several layers (e.g. 2-6) as known in the art. Electronic circuitry 608 further includes three coils, a pitch coil 804 and two yaw coils 806. Electronic circuitry 608 further includes two Hall bar sensing elements, a pitch Hall bar element 808 and a yaw Hall bar element 810. Coils 804 and 806 and Hall bar elements 808 and 810 are all connected (e.g. soldered) to PCB 802. In actuator 120, pitch coil 804 and pitch Hall bar element 808 are positioned below pitch magnet 304. Notably, some of the components mentioned as part of the electronic circuitry are also considered as part of an actuation and sensing mechanism.

Notably, yaw rotation axis 122 is positioned as closely as possible to the pitch sensor (e.g. Hall bar element 808). According to one example, yaw rotation axis 122 passes through pitch sensor 808, in order to decouple the sensing of the pitch sensor from the rotation around the yaw axis. When decoupled, the influence on the sensing of the pitch sensor by rotation around the yaw axis is reduced or eliminated. More specifically, according to one example, yaw rotation axis 122 passes through the center of pitch sensor 808. By positioning the yaw rotation axis so it passes through the center of the pitch sensor, the influence of yaw rotation on the sensing of pitch sensor can be completely eliminated. In addition, in some designs, yaw rotation axis 122 may optionally pass through the center of pitch coil 804.

Figure 9A:
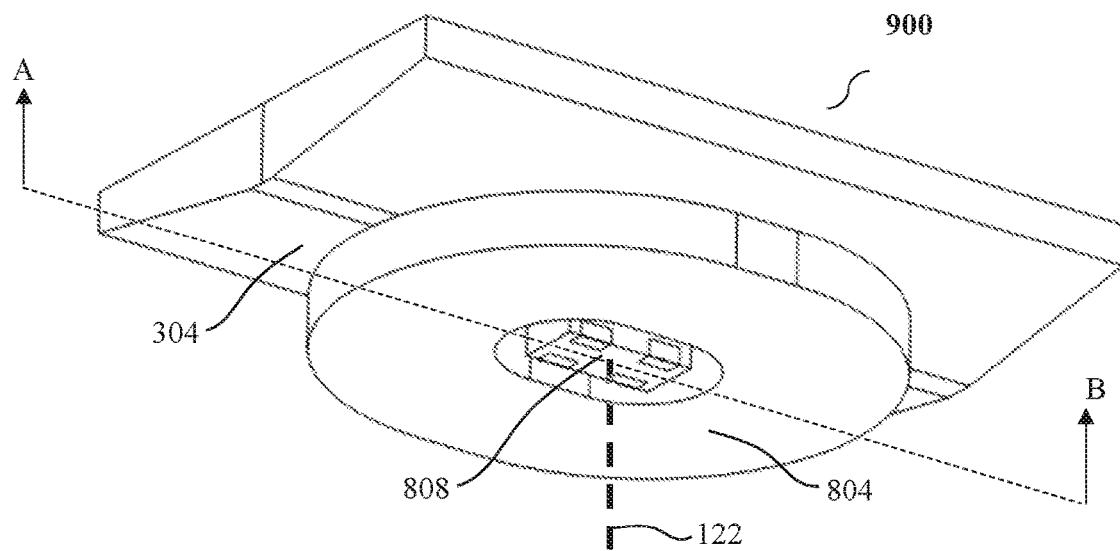
FIG. 9A shows a pitch actuation and sensing mechanism of the actuator in FIGS. 2A-2B in an isometric view, according to some examples of the presently disclosed subject matter.
Figure 9B:
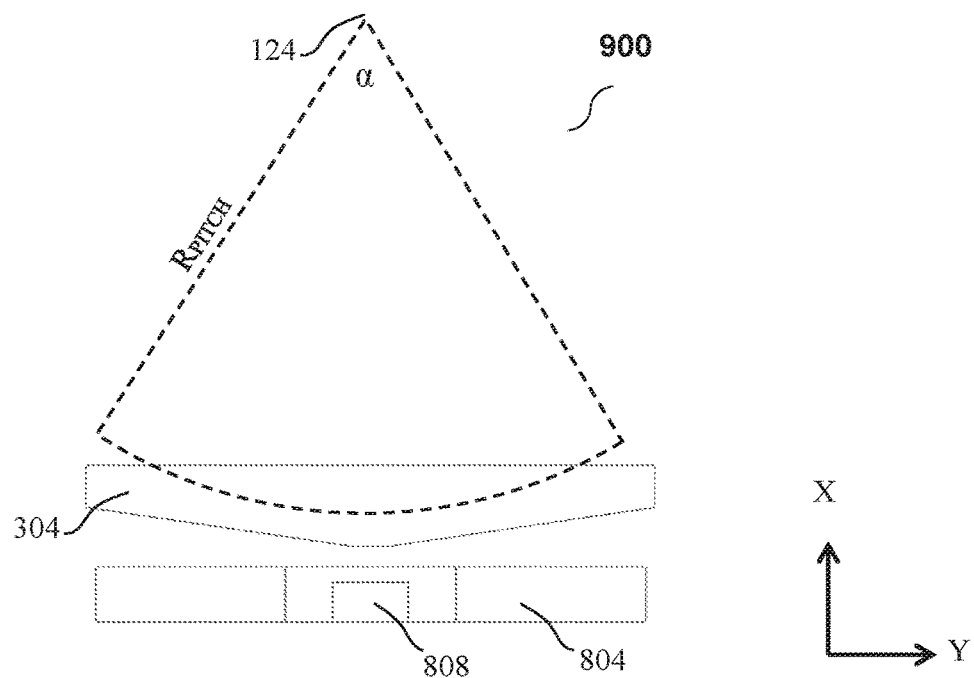
FIG. 9B shows a side cut along a line A-B shown in FIG. 9A of the pitch actuation and sensing mechanism of FIG. 9A, according to some examples of the presently disclosed subject matter.

FIGS. 9A-B show an example of a pitch actuation and sensing mechanism (PAASM) 900 that includes pitch magnet 304, pitch coil 804 and pitch Hall bar element 808. PAASM 900 may be included in actuator 120. In some embodiments, PAASM 900 may be used only for actuation (acting as an actuation mechanism for one DOF). FIG. 9A shows PAASM 900 in an isometric view and FIG. 9B shows a side cut of pitch magnet 304 along a line A-B. According to one example, pitch magnet 304 may be symmetric along a plane that includes pitch rotation axis 124 and first optical axis 108. In an example, pitch magnet 304 may be fabricated (e.g. sintered) such that it has a changing magnetic field direction along its mechanical symmetry plane, e.g. a north magnetic field facing the positive X direction on the left side and a north magnetic field facing the negative X direction on the right side. Pitch magnet 304 may have a length RPITCH of a few millimeters (for example 2-6 mm) in parallel to pitch rotation axis 124 and substantially longer than pitch coil 804, such that its magnetic field on most lines parallel to pitch rotation axis 124 may be considered constant. Upon driving a current in pitch coil 804, a Lorentz force is created on pitch magnet 304; a current in a clockwise direction will create force in the positive Z direction (along the Z axis), while a current in counter clockwise direction will create a force in the negative Z direction. Any force on pitch magnet 304 is translated to torque around pitch rotation axis 124, and thus top actuated subassembly 210 will rotate relative to bottom actuated sub-assembly 220.

Pitch Hall bar element (sensor) 808, which is positioned inside pitch coil 804, can sense the intensity and direction of the magnetic field of pitch magnet 304 radially directed away from pitch rotation axis 124. In other words, for any pitch orientation of top actuated sub-assembly 210, pitch Hall bar measures the intensity of the magnetic field directed in the X direction only. Since yaw rotation axis 122 passes through pitch Hall bar element 808, the effect of the yaw rotation of bottom actuated sub-assembly 220 on the magnetic field in the X direction applied by pitch magnet 304 is reduced (e.g. eliminated) and thus any change on the measurement of pitch Hall bar element 808 is reduced (e.g. eliminated) as well. By positioning the Hall bar element 808 such that the yaw rotation axis 122 passes through its center, the effect of the yaw rotation of bottom actuated sub-assembly 220 on the magnetic field in the X direction applied by pitch magnet 304 is reduced (e.g. minimized) and thus any change on the measurement of pitch Hall bar element 808 is mitigated. Pitch Hall bar element 808 can thus measure the respective pitch rotation of top actuated sub-assembly 210 while being unaffected by the yaw rotation of bottom actuated sub-assembly.

Figure 10A:
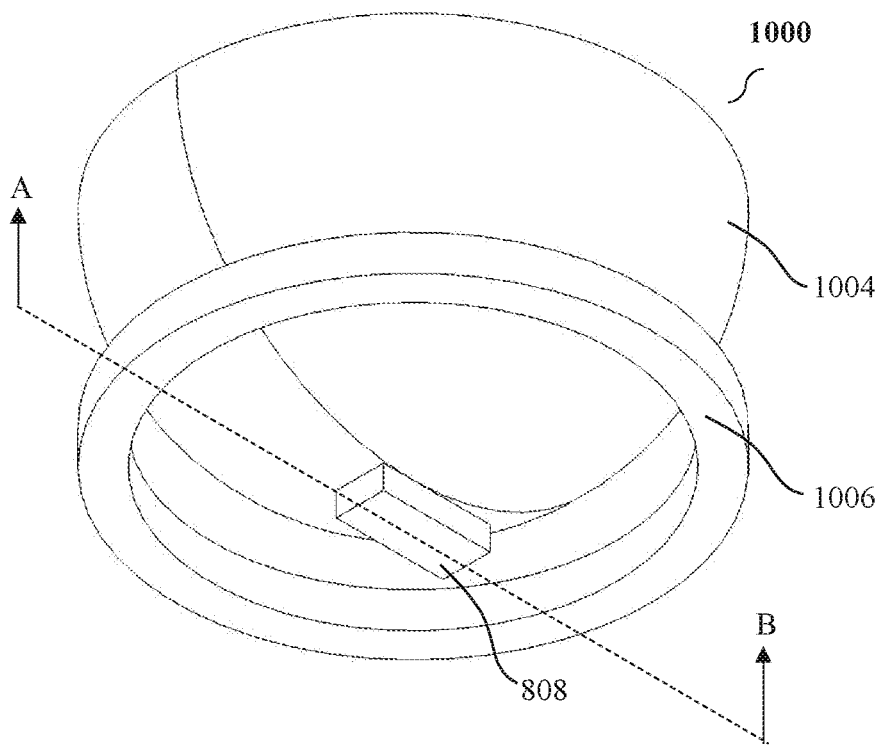
FIG. 10A shows a pitch actuation and sensing mechanism of the actuator in FIGS. 2A-2B in an isometric view, according to other examples of the presently disclosed subject matter.
Figure 10B:
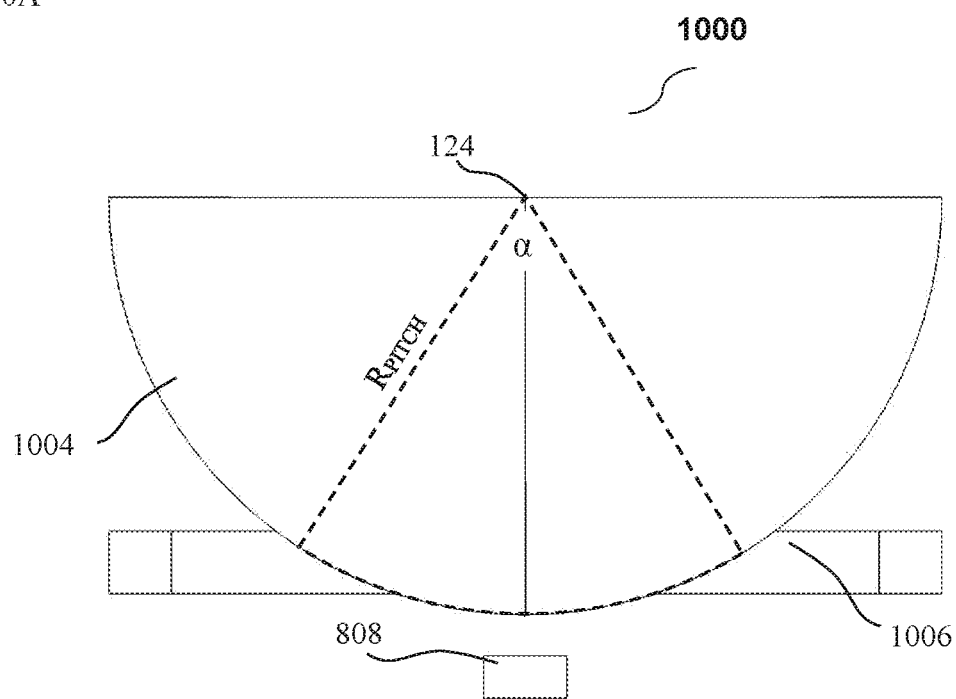
FIG. 10B shows a side cut of the pitch actuation and sensing mechanism of FIG. 10A along a line A-B shown in FIG. 10A, according to some examples of the presently disclosed subject matter.

FIGS. 10A-B show another exemplary embodiment of a PAASM numbered 1000, similar to PAASM 900. PAASM 1000 may be included in actuator 120, to replace PAASM 900. According to one example, a pitch magnet 1004 replaces pitch magnet 304. Pitch magnet 1004 is a cut of a sphere with its center positioned substantially on the intersection point of yaw rotation axis 122 and pitch rotation axis 124. According to one example, a pitch coil 1006 that replaces pitch coil 804 has a circular shape with a center substantially on yaw rotation axis 122 (in some examples the yaw rotation axis passes exactly through the center of the coil). Pitch coil 1006 may be made (fabricated) with similar considerations presented above for pitch coil 804. Due to the symmetry of the pitch magnet around yaw rotation axis 122, any yaw rotation will not influence the magnetic field of the pitch coil and thus will not change the force applied by pitch coil 1006 on pitch magnet 1004. Having a constant force for various yaw positions may facilitate and simplify pitch position control (close loop control or open loop control). As mentioned above, yaw rotation axis passes through sensor 808 to thereby reduce the effect of yaw rotation of bottom actuated sub-assembly 220 on the magnetic field in the X direction applied by pitch magnet 1004.

Figure 11A:
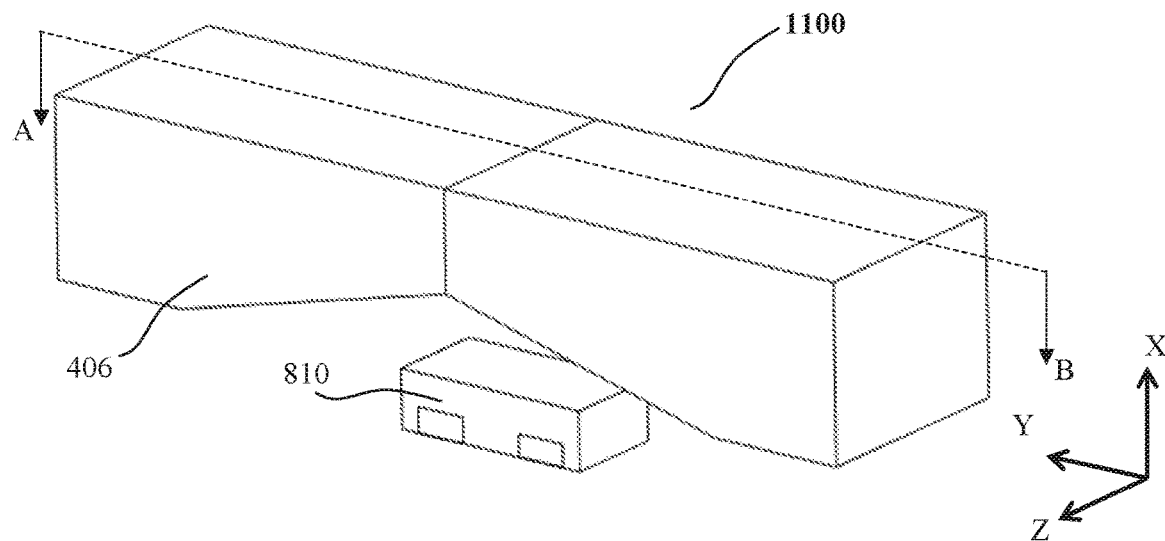
FIG. 11A shows a yaw sensing mechanism of the actuator in FIGS. 2A-2B, according to some examples of the presently disclosed subject matter.

FIG. 11A shows a yaw sensing mechanism numbered 1100. Yaw sensing mechanism 1100 includes yaw sensing magnet 406 and yaw Hall bar element 810. Yaw Hall bar element 810 can measure the intensity and direction of the magnetic field of yaw sensing magnet 406 directed along yaw rotation axis 122. In other words, Hall bar element 810 measures the intensity of magnetic field directed in the X direction only.

Figure 11B:
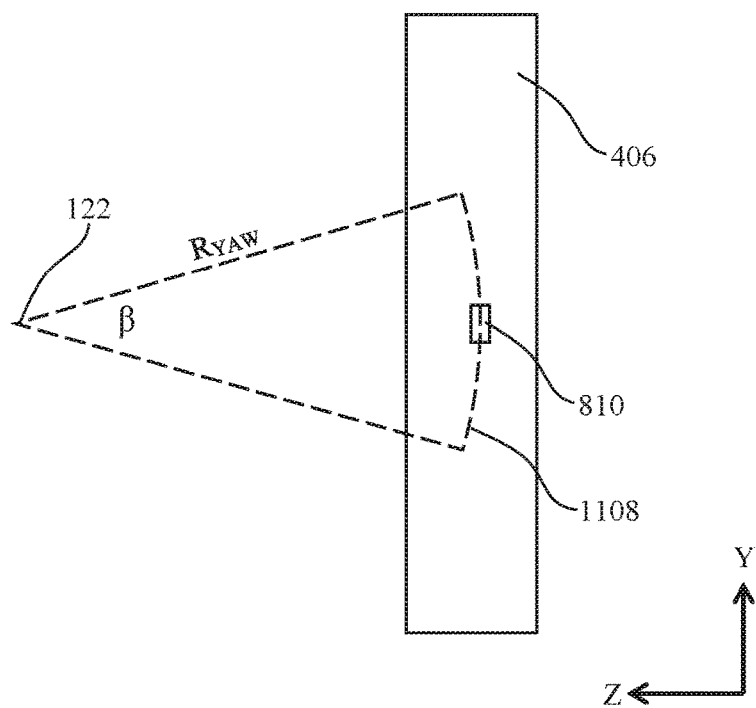
FIG. 11B shows a yaw rotation range β, a distance $R_{YAW}$ between a yaw Hall bar element and a yaw rotation axis, and a trajectory of a yaw sensing magnet of the yaw sensing mechanism of FIG. 11A in the Y-Z plane, according to some examples of the presently disclosed subject matter.

FIG. 11B shows a yaw rotation range β, a distance $R_{YAW}$ between yaw Hall bar element 810 and yaw rotation axis 122, and a trajectory 1108 of yaw sensing magnet 406 in the Y-Z plane. In some examples, yaw rotation range β is more than 10 degrees. The distance $R_{YAW}$ is e.g. in the range of 2-5mm. As an example, a case in which β=40° (meaning ±20° from the "zero" position) and $R_{YAW}$=2.75 mm is analyzed in FIGS. 11C-F below. As bottom actuated sub-assembly 220 is yaw-rotated, trajectory 1108 is in the Y-Z plane. Trajectory 1108 has an arc projection in the Y-Z plane (FIG. 11B) with length $β \times R_{YAW}$, where β is calculated in radians. Trajectory 1108 has a line shape projection on the X-Y plane (FIGS. 11C-E) with length $2 \times R_{YAW} \times \cos(β)$.

Yaw sensing magnet 406 is designed such that is has dimensions along Z-Y directions and such that it covers trajectory 1108 from the top view (Y-Z plane). Yaw sensing magnet 406 can have different configurations.

Figure 11C:
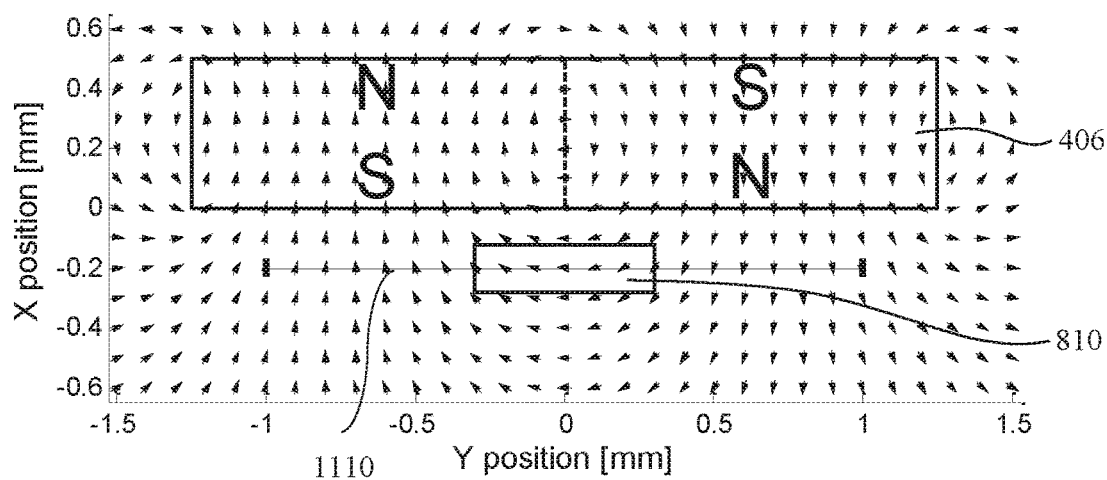
FIG. 11C shows one magnetic configuration for the yaw sensing magnet of FIG. 11B in a cut along a line A-B shown in FIG. 11A, according to some examples of the presently disclosed subject matter.
Figure 11D:
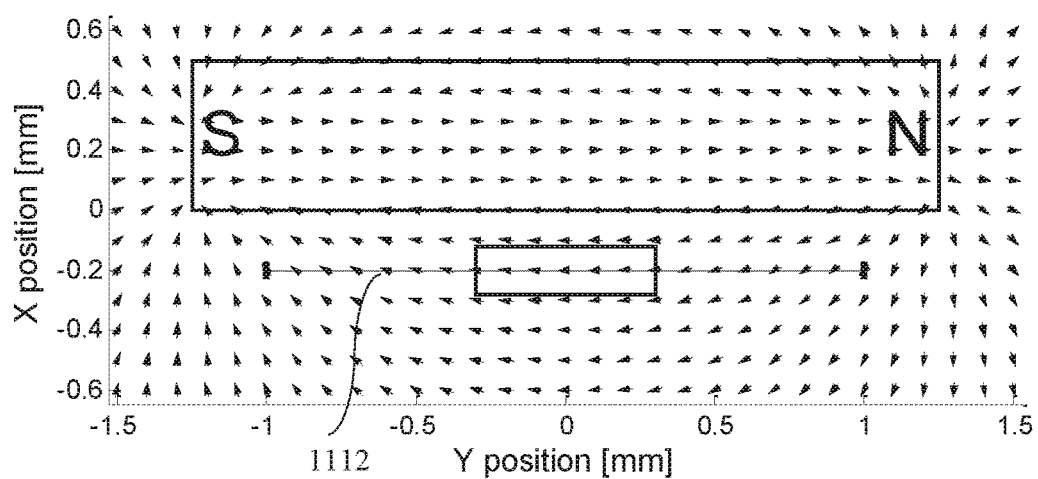
FIG. 11D shows another magnetic configuration for the yaw sensing magnet of FIG. 11B in a cut along a line A-B shown in FIG. 11A, according to some examples of the presently disclosed subject matter.
Figure 11E:
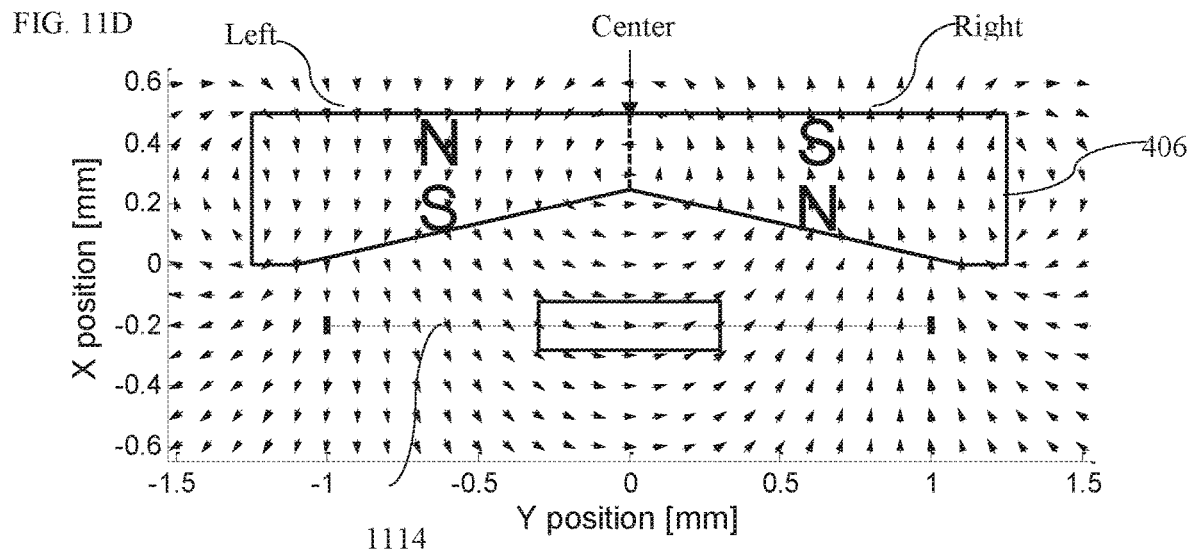
FIG. 11E shows yet another magnetic configuration for the yaw sensing magnet of FIG. 11B in a cut along a line A-B shown in FIG. 11A, according to some examples of the presently disclosed subject matter.

FIGS. 11C-E show three different examples of magnetic configurations for yaw sensing magnet 406 in a cross section along X-Y plane of yaw sensing mechanism 1100. In the configuration of FIG. 11C, yaw sensing magnet 406 has a rectangular cross section and the magnetic field of yaw sensing magnet 406 changes direction in the middle, e.g. the north magnetic field facing the positive X direction on the left side and the north magnetic field facing the negative X direction on the right side. In the configuration of FIG. 11D, yaw sensing magnet 406 has a rectangular cross section, and the magnetic field of yaw sensing magnet 406 is directed in the Y direction.

In the configuration shown in FIG. 11E, yaw sensing magnet 406 is characterized, along the Y direction, by a thinner cross section (the Y-X plane) in the middle and a thicker cross section on the sides. The varying width results in a varying distance between the sensor and the magnet positioned near the magnet (the sensor is located towards the negative X direction relative to the magnet) and thus a varying magnetic field along a projection of trajectory 1108 (line 1114) on the Y-X plane. In some examples, the variation around the magnetic field is symmetrical around its center such that the thickness of the cross section of the magnet increases from a point substantially at its center towards each end of the magnet. Various examples of magnets constructed according to this principle are illustrated in FIGS. 11-i to 11-vi.

In addition, in some examples of the configuration of FIG. 11E (or any one of FIGS. 11-i to 11-vi), the magnetic field of yaw sensing magnet 406 changes direction in the middle, e.g. the north magnetic field faces the positive X direction on the left side and the north magnetic field faces the negative X direction on the right side. This results in zero magnetic field in the X direction in yaw hall bar element 810 facing the center of magnet 406 (along the center line).

Figure 11F:
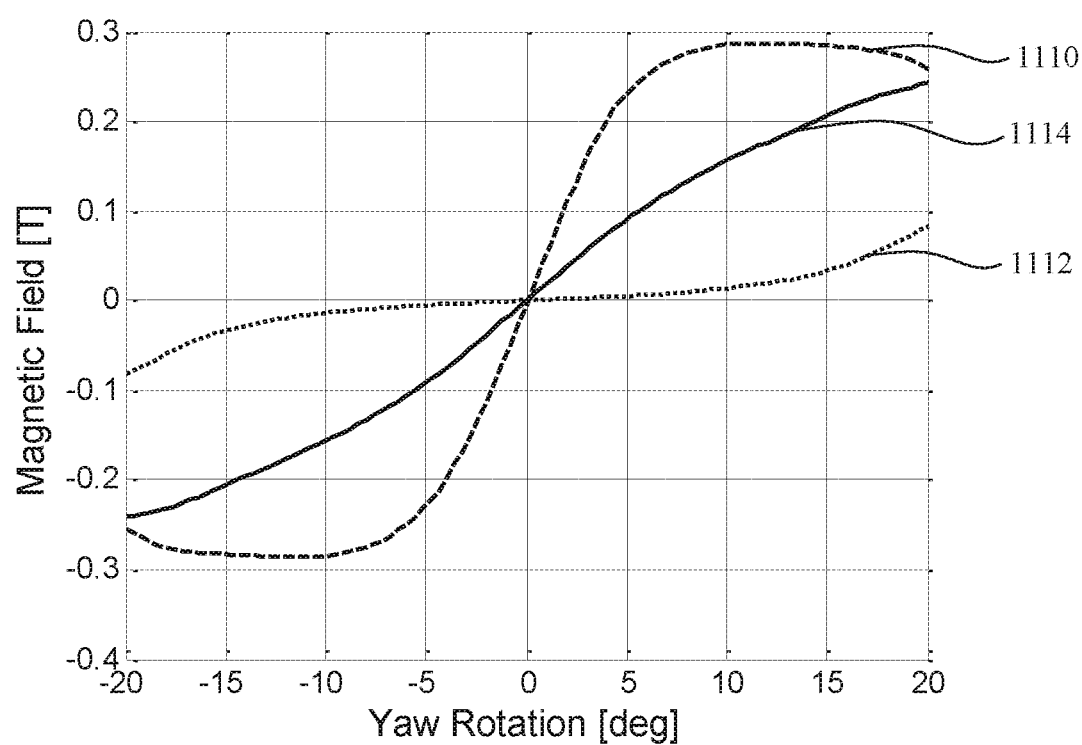
FIG. 11F shows the magnetic field as a function of rotation along a given trajectory for the cases presented in FIGS. 11C-E, according to some examples of the presently disclosed subject matter.

FIG. 11F shows the magnetic field as a function of rotation along trajectory 1108, for the 3 cases presented in FIGS. 11C-E. The projection of trajectory 1108 on plane X-Y (representing a lateral shift component of the magnet shift relative to the sensor) is shown by line 1110 in FIG. 11C, line 1112 in FIG. 11D and line 1114 in FIG. 11E. For line 1110, the maximal magnetic field change along ±20 degrees trajectory is ±0.28 Tesla. However, most of the magnetic field change is obtained in a ±7 degrees trajectory and the magnetic field gradient at higher yaw angles is lower than at lower yaw angles. This limits the ability to sense changes with high accuracy in high yaw angles. For projection line 1112, the magnetic field gradient is more uniform along the trajectory of ±20, comparing to projection line 1110. However, the magnetic field total change is limited to under ±0.08 Tesla. For projection line 1114 the magnetic field gradient is more uniform than for both lines 1110 and 1112, and the total magnetic field change is ±0.25 Tesla, which can give high accuracy for position measurements. Thus, the magnetic configuration presented in FIG. 11E is superior for position sensing at large strokes, relative to the distance between the Hall bar and the corresponding magnet (e.g. in 1-4 mm range) using changes in magnetic field. Thus, by shaping the magnet with a variable thickness as shown in FIGS. 11E and 11-i to 11-vi, the range of detectable change in magnetic flux in increased. Accordingly, the corresponding detectable range of relative (lateral) shift of the magnet and sensor is increased as well.

Figure 12A:
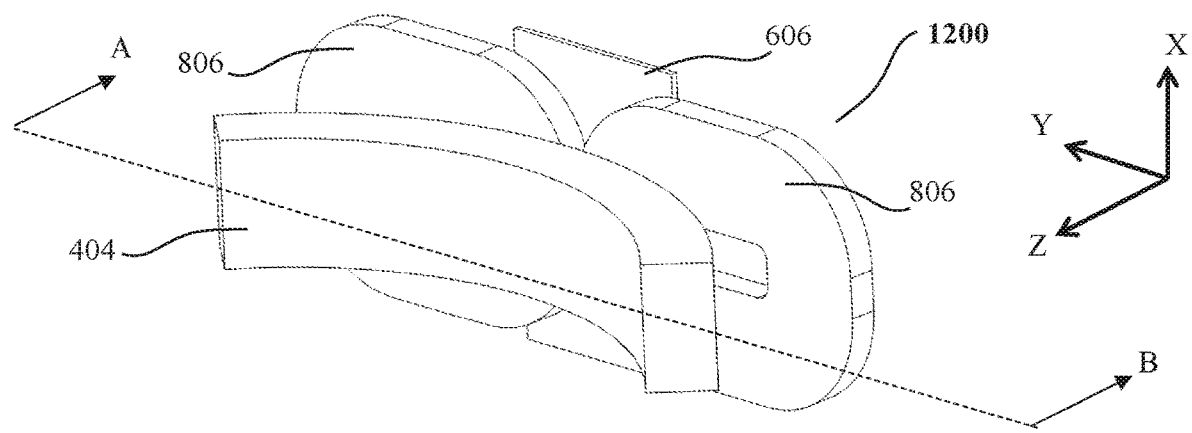
FIG. 12A shows a yaw magnetic actuation mechanism in an isometric view from one side, according to some examples of the presently disclosed subject matter
Figure 12B:
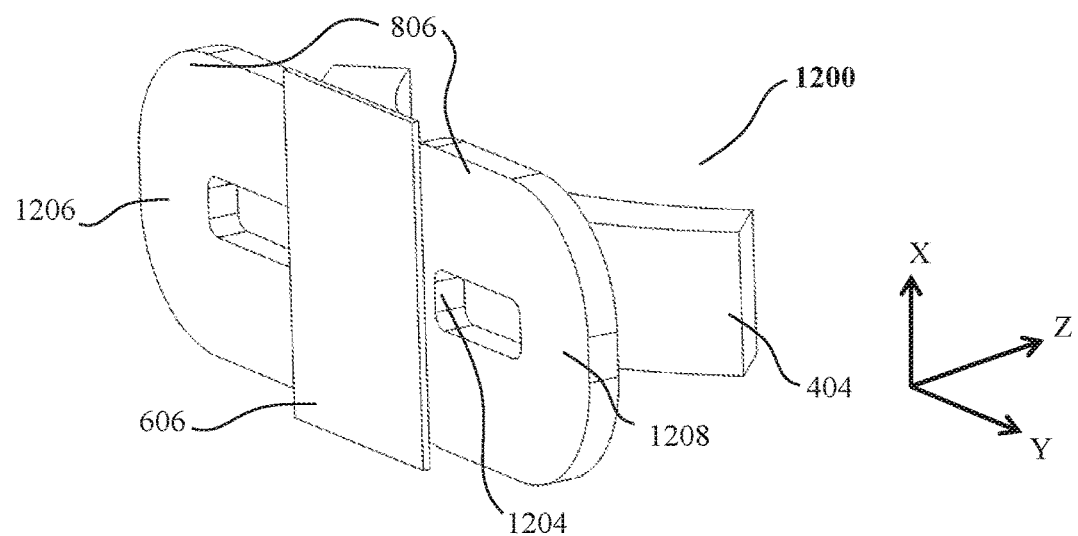
FIG. 12B shows the yaw magnetic actuation mechanism of FIG. 12A in an isometric view from another side, according to some examples of the presently disclosed subject matter.
Figure 12C:
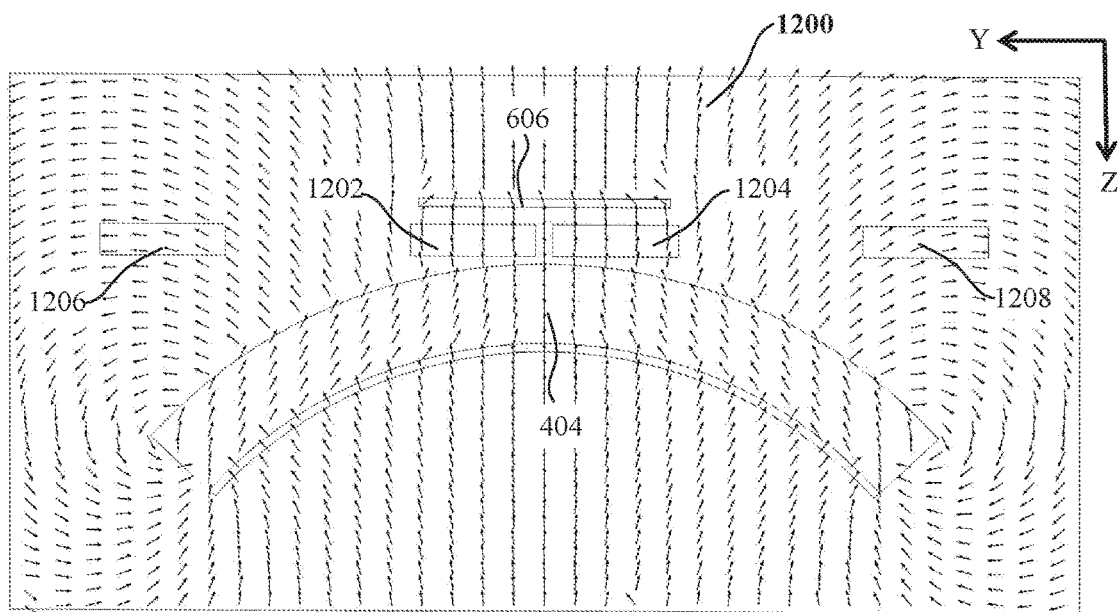
FIG. 12C shows magnetic field directions in a Y-Z plane along a cut A-B in FIG. 12A, according to some examples of the presently disclosed subject matter.

FIG. 12A-C shows a yaw magnetic actuation mechanism numbered 1200. This actuation mechanism is for a second DOF. FIG. 12A show isometric view from one side, FIG. 12B shows isometric view from another side. Yaw magnetic actuation mechanism 1200 include yaw actuation magnet 404, yaw coils 806 and ferromagnetic yoke 606. FIG. 12C shows the magnetic field directions is Y-Z plane, along a cut A-B in FIG. 12A. Yaw actuation magnet 404 may be sintered such that its magnetic field is pointed toward negative Z direction. Each of coils 806 has one part (1202, 1204) which is positioned in close proximity to yaw actuation magnet 404 (e.g. distance of 100-300 μm), and one part (1206, 1208) which is further apart from yaw magnet 404. Coils 806 may be connected in serial, such that the current in the two coil is equal. When current in 1202 is in the positive X direction the current in 1204 is also in the positive X direction, and the current in parts 1206 and 1208 is in the negative X direction. Upon driving a current in Yaw coils 806, a Lorentz force is created on the yaw magnet 404, according to $d\vec{F}=Id\vec{l}\times\vec{B}$. The direction of the magnetic field is demonstrated in FIG. 12C. The Lorentz force is translated into torque around yaw rotation axis 122.

Figure 13:
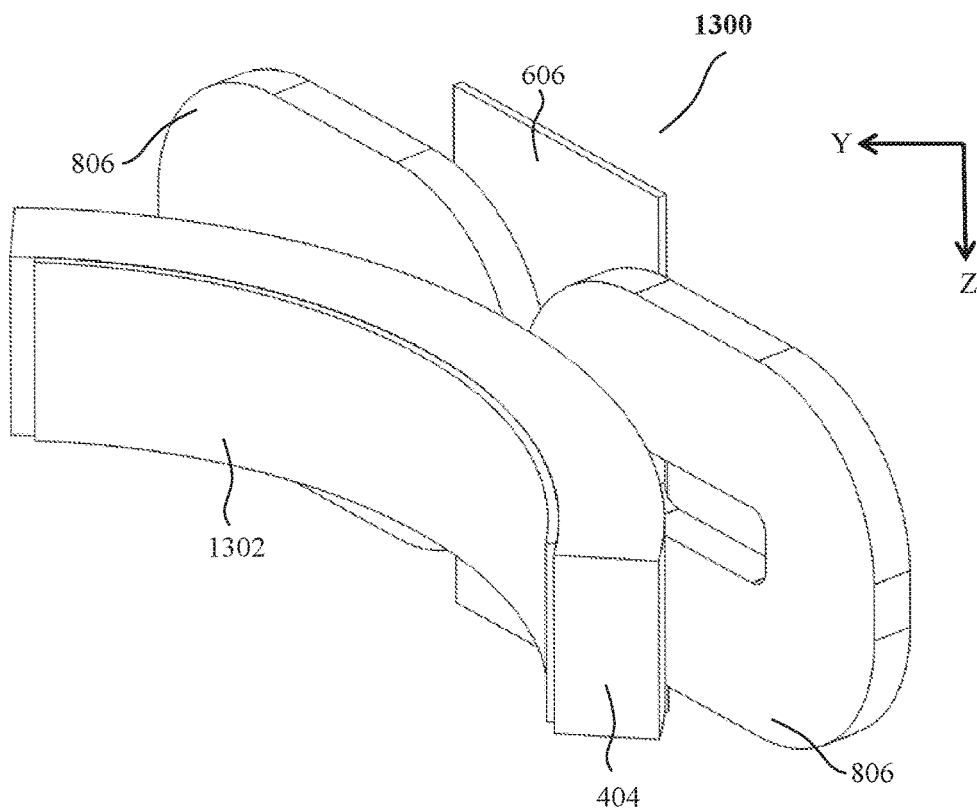
FIG. 13 shows additional magnetic yoke positioned next to yaw magnet, according to some examples of the presently disclosed subject matter.

In some examples, an additional magnetic yoke 1302 may be located next to yaw magnet 404. This yoke may increase the intensity of the magnetic field in coils 806 and increase the torque created by yaw magnetic actuation mechanism 1200. FIG. 13 shows this case.

In some examples, rotation of the reflecting element around one or two axes moves the position of the camera FOV, wherein in each position a different portion of a scene is captured in an image having the resolution of the digital camera. In this way a plurality of images of adjacent camera FOVs (e.g. partially overlapping FOVs) are captured and stitched together to form a stitched (also referred to as "composite") image having an overall image area of an FOV greater than digital camera FOV.

In some examples the digital camera can be a folded Tele camera configured to provide a Tele image with a Tele image resolution, the folded Tele camera comprising a Tele image sensor and its Tele lens assembly is characterized with a Tele field of view ($FOV_T$).

According to some examples, the folded Tele camera is integrated in a multiple aperture digital camera that comprises at least one additional upright Wide camera configured to provide a Wide image with a Wide image resolution, being smaller than the Tele image resolution, the Wide camera comprising a Wide image sensor and a Wide lens module with a Wide field of view ($FOV_W$); wherein $FOV_T$ is smaller than $FOV_W$, wherein rotation of the OPFE moves $FOV_T$ relative to $FOV_W$, for example as shown in of co-owned international patent applications PCT/IB2016/056060 and PCT/IB2016/057366.

The description of these PCT applications includes a Tele camera with an adjustable Tele field of view. As described in PCT/IB2016/056060 and PCT/IB2016/057366, rotation of the reflecting element around one or two axes moves the position of Tele FOV ($FOV_T$) relative to the Wide FOV ($FOV_W$), wherein in each position a different portion a scene (within $FOV_W$) is captured in a "Tele image" with higher resolution. According to some examples, disclosed in PCT/IB2016/056060 and PCT/IB2016/057366, a plurality of Tele images of adjacent non-overlapping (or partially overlapping) Tele FOVs are captured and stitched together to form a stitched (also referred to as "composite") Tele image having an overall image area of an FOV greater than FOVT. According to some examples, the stitched Tele image is fused with the Wide image generated by the Wide camera.

Digital camera 100 can further comprise or be otherwise operatively connected to a computer processing circuitry (comprising one or more computer processing devices), which is configured to control the operation of the digital camera (e.g. camera CPU). The processing circuitry, can comprise for example a controller operatively connected to the actuator of the rotating OPFE configured to control its operation.

The processing circuitry can be responsive to a command requesting an image with a certain zoom factor and control the operation of the digital camera for providing images having the requested zoom. As mentioned in applications PCT/IB2016/056060 and PCT/IB2016/057366, in some examples a user interface (executed for example by the processing circuitry) can be configured to allow input of user command being indicative of a requested zoom factor. The processing circuitry can be configured to process the command and provide appropriate instructions to the digital camera for capturing images having the requested zoom.

In some cases, if the requested zoom factor is a value between the $FOV_W$ of a wide camera and $FOV_T$ of a tele camera, the processing circuitry can be configured to cause the actuator of the reflecting element to move the reflecting element (by providing instruction to the controller of the actuator) such that a partial area of the scene corresponding to the requested zoom factor is scanned and a plurality of partially overlapping or non-overlapping Tele images, each having a Tele resolution and covering a portion of the partial area, are captured. The processing circuitry can be further configured to stitch the plurality of captured imaged together in order to form a stitched image (composite image) having Tele resolution and an FOV greater than the FOVT of the digital camera. Optionally the stitched image can then be fused with the Wide image.

Figure 14A:
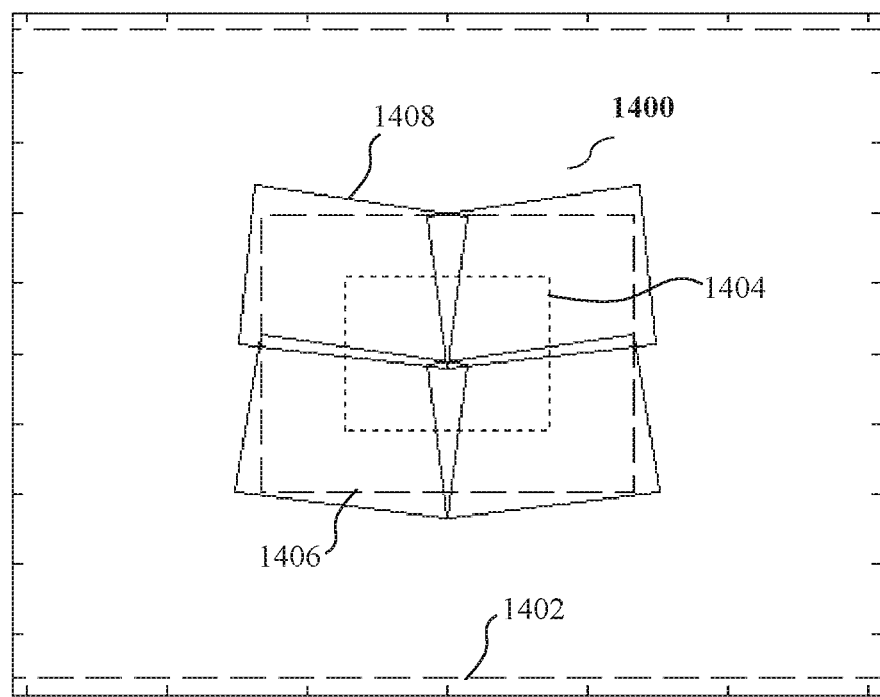
FIG. 14A is a schematic illustration of a stitched image generated from four Tele images, according to some examples of the presently disclosed subject matter.

FIG. 14A is a schematic illustration of an example of a stitched image 1400 generated by scanning, capturing and stitching together four Tele images with $FOV_T$, compared to the $FOV_W$ of a Wide camera, as in the example of FIG. 1C, where camera 190 represents a Wide FOV camera with a $FOV_W$ coupled to folded Tele camera 100 with a $FOV_T$. In FIG. 14A, 1402 denotes $FOV_W$, 1404 denotes $FOV_T$ at the center of $FOV_W$ and 1406 indicates the size of the requested zoom factor. In the illustrated example, four partially overlapping Tele images 1408 are captured.

Notably, the overall area of captured Tele images 1408 is greater than the area of the zoom image 1406 in the requested zoom. The central part of the captured Tele images is extracted (e.g. by the computer processing circuitry as part of the generation of the stitched image) for generating stitched image 1400. This helps to reduce the effect of image artefacts resulting from transition from an image area covered by one image to an image area covered by a different image.

Figure 14B:
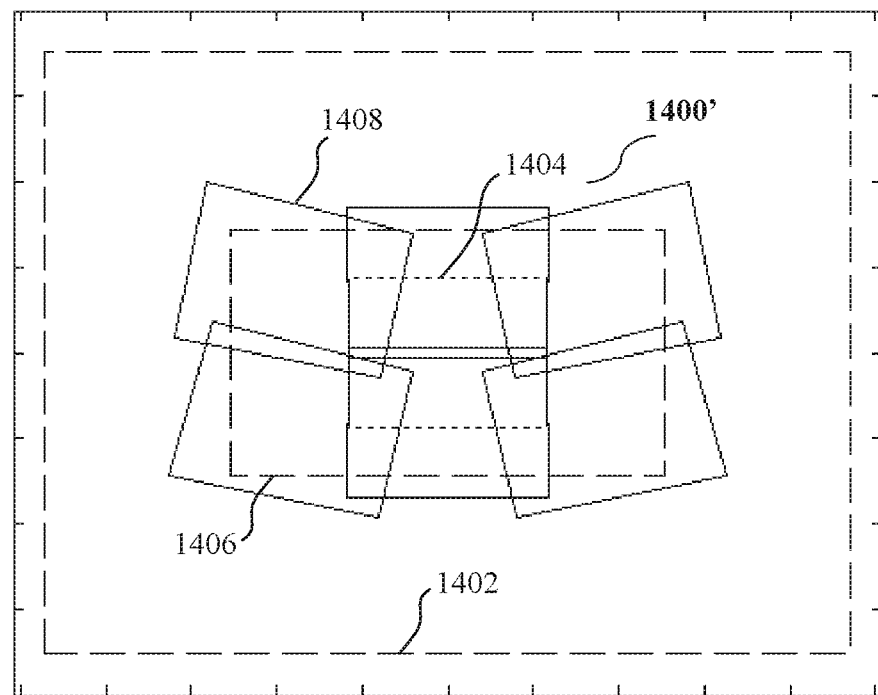
FIG. 14B is a schematic illustration of a stitched image generated from six Tele images, according to some examples of the presently disclosed subject matter.
Figure 14C:
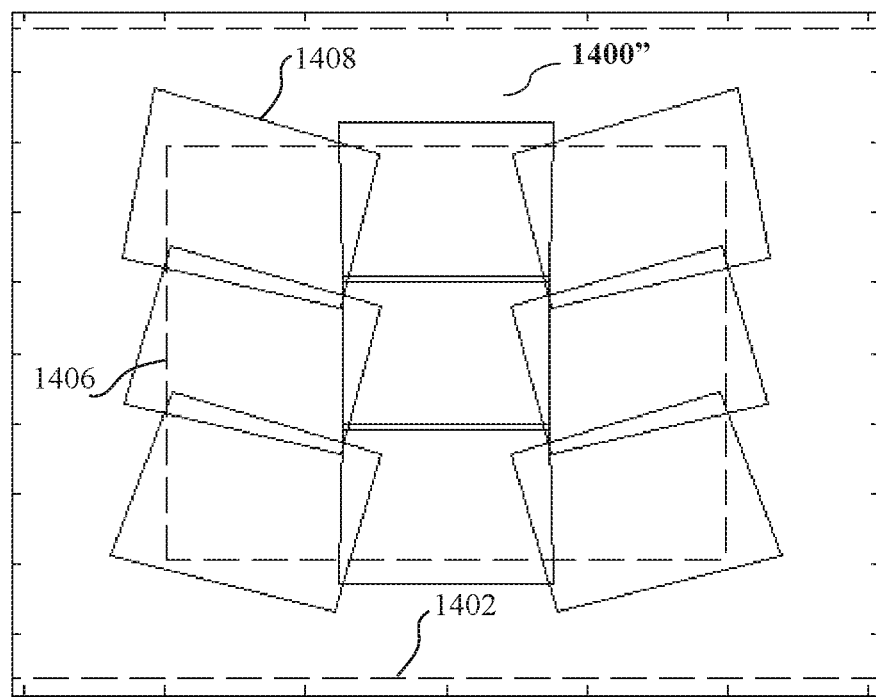
FIG. 14C is a schematic illustration of a stitched image generated from nine Tele images, according to some examples of the presently disclosed subject matter.

FIG. 14B is a schematic illustration of an example of a stitched image 1400' generated by capturing and stitching together six Tele images. FIG. 14C is a schematic illustration of an example of a stitched image 1400''' generated by capturing and stitching together nine Tele images. The same principles described with reference to FIG. 14A apply to FIGS. 14B and 14C. Notably, the output image resulting from the stitching can have a different width to height ratio than the single image proportion. For example, as illustrated in FIG. 14B, a single image can have a 3:4 ratio and the output stitched image can have a 9:16 ratio.

It is noted that image stitching per se is well known in the art and therefore it is not explained further in detail.

An alternative design of the top and bottom actuated sub-assemblies described above is now described with reference to FIGS. 15A-15E. Notably, as would be apparent to any person skilled in the art, unless stated otherwise, some of the details described above with reference to the previous figures can also be applied to the example described with reference to FIGS. 15A-15E.

According to this design, a single magnet 1510 serves for three purposes: 1) as a pre-load magnet in magnet-yoke pair, dedicated for fastening the bottom actuated sub-assembly to the stationary sub-assembly; 2) as a yaw actuation magnet dedicated for generating yaw movement of bottom actuated sub-assembly; and 3) as a yaw sensing magnet for sensing yaw movement.

Figure 15A:
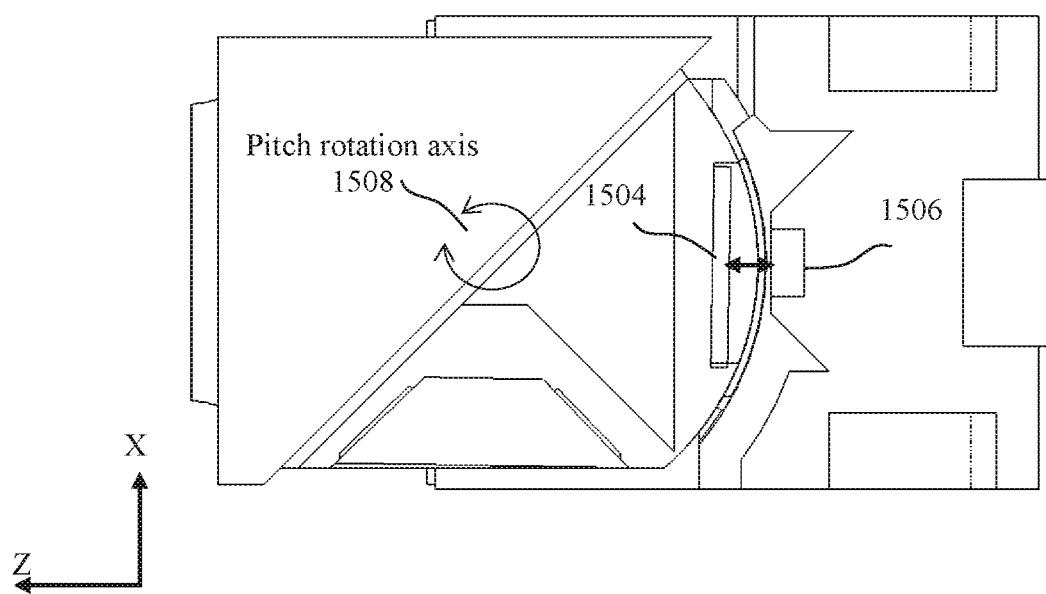
FIG. 15A is a cross section of top actuated sub-assembly and bottom actuated sub-assembly installed together along a cut along line A-B shown in FIG. 15B, according to other examples of the presently disclosed subject matter.

FIG. 15A shows a magnet 1506 and a yoke (e.g. a ferromagnetic plate such as iron) 1504, where the magnet and yoke are pulled together by pre-load force (indicated by black double head arrow) and thus fasten top actuated sub-assembly 210 to bottom actuated sub-assembly 220. In some examples, magnet 1506 and yoke 1504 are positioned substantially at the center (relative to the Y axis direction) of the top actuated sub-assembly. Pitch rotation axis relative to the bottom actuated sub-assembly is demonstrated by the circular arrow 1508.

Figure 15B:
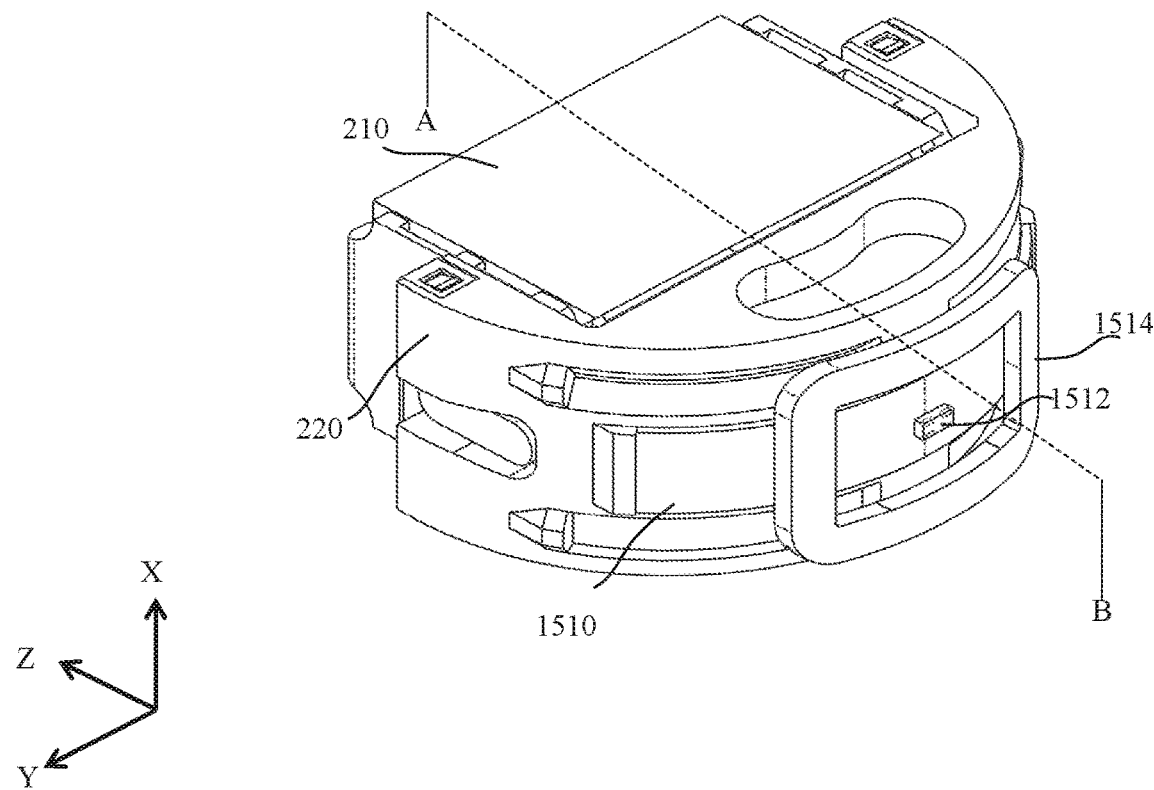
FIG. 15B is an isometric view of top actuated sub-assembly and bottom actuated sub-assembly installed together of the example shown in FIG. 15A, according to other examples of the presently disclosed subject matter.

FIG. 15B shows top and bottom actuated sub-assemblies in isometric view. FIG. 15B illustrates magnet 1510 located at the internal part of bottom actuated sub-assembly, sensor 1512 and a coil 1514, which is located at the back of bottom actuated sub-assembly (in the positive Z direction relative to magnet 1510). According to one example, a single coil can be used for actuation.

Figure 15C:
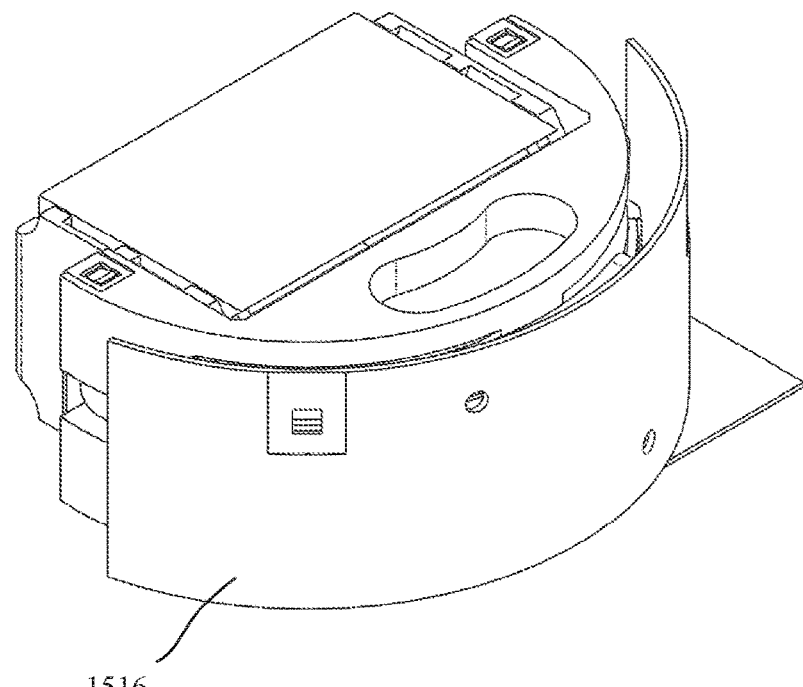
FIG. 15C is an isometric view of top actuated sub-assembly and bottom actuated sub-assembly installed together, showing an external yoke, according to other examples of the presently disclosed subject matter.

As shown in FIG. 15C, yoke 1516, is fastened to the stationary sub-assembly. Magnet 1510 and yoke 1516 are attracted by pre-load force to thereby fasten bottom actuated sub-assembly 220 to stationary sub-assembly 230. Coil 1514 is positioned in close proximity to yaw actuation magnet 1510 (e.g. distance of 100-300 μm). When current is applied in coil 1514, a Lorentz force is created on yaw magnet 1510 according to $d\vec{F}=Id\vec{l}\times\vec{B}$, where the Lorentz force is translated into torque around yaw rotation axis 122 (not shown) as explained above.

Magnet 1510 moves along the yaw direction as part of the bottom actuated sub-assembly. In addition of being more compact, this type of yaw actuation mechanism also provides better efficiency, as it does not generate force in the opposite direction to the desired yaw movement.

As explained above, in some examples top actuated sub-assembly 210 includes an OPFE holder (or carrier) 302 and bottom actuated sub-assembly includes a middle moving frame 402. According to an example, yoke 1504 is attached (e.g. glued) to the holder and the first magnet-yoke pair (1506-1504) pulls the OPFE holder to the middle moving frame. Alternatively, the position of the magnet and yoke can be switched. The stationary sub-assembly includes a base and the yoke is attached to the based in a manner that the second magnet-yoke pair (1510-1516) pulls the middle moving frame to the base. Also, in an example coil 1514 and sensor 1512 are fixed (e.g. glued) to the base.

According to some examples of the presently disclosed subject matter yaw magnet 1510, which also serves as yaw sensing magnet, is made to have an increased detection range. To this end, magnet 1510 is made to have a single magnetic polarization direction as indicated by the back arrow extending from the south pole to the north pole of magnet 1510 shown in FIG. 15D. The directions of the magnetic field lines are indicated by arrows a-e in FIG. 15D and in more detail in FIG. 15E, which is a top view of magnet 1510. As indicated by arrows a-e, as a result of the single magnetic polarization direction of magnet 1510, the angle of the magnetic field relative to the magnet surface changes continuously along the length of magnet. The illustration shows the angle changing from being substantially perpendicular in the positive direction at one end, to being in a parallel direction at the magnet center and to being substantially perpendicular in the negative direction at the other one. Since the relative changes (e.g. of magnetic flux) are detectable at each of the points where change in the direction of the magnetic field occurs, yaw movement of the magnet relative to sensor 1512 can be detected over an increased range. The increased detection range of the yaw magnet as disclosed herein enables to use the same magnet for both actuation and sensing, eliminating the need for two separate magnets.

Note that unless stated otherwise terms such as "first" and "second" as used herein are not meant to imply a particular order but are only meant to distinguish between two elements or actions in the sense of "one" and "another".

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A mobile device, comprising:
   a screen;
   a first upright camera comprising a first field-of-view (FOV1) and a first image sensor that lies in a plane parallel to the screen, wherein the first upright camera is configured to provide a Wide image with a Wide image resolution; and
   a folded camera comprising a second field-of-view (FOV2), a lens module, a light folding element having a reflection surface, and a second image sensor, wherein FOV2<FOV1,
   wherein the reflection surface is configured to receive light from a first direction and to redirect the light to a second direction that is different from the first direction, wherein the reflection surface has an angle α with the screen that fulfills α <45 degrees,
wherein the first upright camera comprises an auto-focus mechanism, and
wherein the folded camera is configured to shift the second image sensor for optical image stabilization.

2. The mobile device of claim 1, wherein α ≤40 degrees.

3. The mobile device of claim 1, wherein α ≤35 degrees.

4. The mobile device of claim 1, wherein α ≤30 degrees.

5. The mobile device of claim 1, wherein 5 degrees≤α≤45 degrees.

6. The mobile device of claim 1, wherein the folded camera is an auto-focus camera.

7. The mobile device of claim 6, wherein the folded camera is configured to provide a Tele image with a Tele image resolution different from the Wide image resolution.

8. The mobile device of claim 7, wherein the lens module comprises 3 to 7 lens elements.

9. The mobile device of claim 8, wherein the reflection surface is of a prism.

10. The mobile device of claim 9, further comprising a second upright camera.

11. The mobile device of claim 10, wherein the folded camera has a fixed focal length.

12. The mobile device of claim 11, wherein the folded camera is configured to shift the second image sensor in a direction parallel to the screen.

13. The mobile device of claim 1, wherein the mobile device is a smartphone.

14. A mobile device comprising:
a screen,
a first upright camera comprising a first field-of-view (FOV1) and a first image sensor that lies in a plane parallel to the screen, wherein the first upright camera is configured to provide a Wide image with a Wide image resolution; and
a folded camera comprising a second field-of-view (FOV2), a lens module, a light folding element having a reflection surface, and a second image sensor,
wherein FOV2<FOV1,
wherein the reflection surface is configured to receive light from a first direction and to redirect the light to the second direction different from the first direction,
wherein an angle β between the first direction and the second direction fulfills β>90 degrees,
wherein the first upright camera is an auto-focus camera, and
wherein the folded camera is configured to shift the second image sensor for optical image stabilization.

15. The mobile device of claim 14, wherein β>95 degrees.

16. The mobile device of claim 14, wherein β>105 degrees.

17. The mobile device of claim 14, wherein 90 degrees <β≤130 degrees.

18. The mobile device of claim 14, wherein the lens module comprises 3 to 7 lens elements.

19. The mobile device of claim 18, wherein the reflection surface is of a prism.

20. The mobile device of claim 19, wherein the folded camera is an auto-focus camera.

21. The mobile device of claim 20, wherein the folded camera is configured to provide a Tele image with a Tele image resolution different from the Wide image resolution.

22. The mobile device of claim 21, further comprising a second upright camera.

23. The mobile device of claim 22, wherein the folded camera is configured to shift the second image sensor in a direction parallel to the screen.

24. The mobile device of claim 14, wherein the mobile device is a smartphone.

25. A mobile device comprising:
a screen;
a first upright camera comprising a first field-of-view FOV1 and a first image sensor that lies in a plane parallel to the screen, wherein the first upright camera is configured to provide a Wide image with a Wide image resolution; and
a second folded camera comprising a second FOV2, a lens module and a second image sensor,
wherein FOV2<FOV1,
wherein the second folded camera is configured to shift the second image sensor for optical image stabilization, and
wherein the second folded camera is configured to provide a Tele image with a Tele image resolution different from the Wide image resolution.

26. The mobile device of claim 25, wherein the first upright camera is an auto-focus camera.

27. The mobile device of claim 26, wherein the second folded camera is configured to shift the second image sensor in a direction parallel to the screen.

28. The mobile device of claim 27, further comprising a third camera, wherein the third camera has a third image sensor disposed in the plane parallel to the screen.

29. The mobile device of claim 28, wherein the lens module comprises 3 to 7 lens elements.

30. The mobile device of claim 29, wherein the second folded camera further comprises a light folding element having a reflection surface, and wherein the reflection surface is configured to receive light from a first direction and to redirect the light to a second direction different from the first direction.

31. The mobile device of claim 30, wherein the reflection surface has an angle γ with the screen that fulfills 30 degrees ≤γ<45 degrees.

32. The mobile device of claim 30, wherein an angle between the first direction and the second direction is smaller than 90 degrees.

33. The mobile device of claim 32, wherein the reflection surface is a prism.

34. The mobile device of claim 25, wherein the mobile device is a smartphone.

* * * * *